United States Patent [19]

Kawakami et al.

[11] Patent Number: 5,331,411
[45] Date of Patent: Jul. 19, 1994

[54] INTEGRATED CIRCUIT FOR PROCESSING DIGITAL SIGNALS IN VIDEO CAMERA HAVING ELECTRONIC ZOOMING FUNCTION

[75] Inventors: Kiyotada Kawakami; Masao Takuma, both of Osaka; Tooru Asaeda, Nara; Tooru Yamamoto; Haruhiko Murata, both of Osaka; Hirotsugu Murashima, Nara; Tohru Watanabe, Fifu; Masashi Honzawa, Gunma; Keiichi Tanii, Osaka, all of Japan

[73] Assignee: Sanyo Electric Co., Ltd., Osaka, Japan

[21] Appl. No.: 784,228

[22] Filed: Oct. 29, 1991

[30] Foreign Application Priority Data

Oct. 31, 1990 [JP] Japan .................. 2-295643

[51] Int. Cl.$^5$ ............ H04N 3/223; H04N 9/04; H04N 5/232
[52] U.S. Cl. ............ 348/708; 348/240; 348/253; 348/222
[58] Field of Search ........... 358/180, 22, 183, 160, 358/166, 21, 227, 209, 222, 224, 213.26, 213.27, 41, 44, 451; H04N 3/223, 9/04, 5/232

[56] References Cited

U.S. PATENT DOCUMENTS

| 4,774,581 | 9/1988 | Shiratsuchi | 358/180 |
| 4,914,507 | 4/1990 | Smith et al. | 358/22 |
| 4,991,022 | 2/1991 | Canfield et al. | 358/180 |
| 5,057,923 | 10/1991 | Matsuda | 358/21 |

OTHER PUBLICATIONS

A. Morimura et al., "Digital Signal Processing LSI MN6730, MN6731 for Consumer Video Cameras", *National Technical Report*, vol. 36, No. 3, Jun. 1990, pp. 85-90 (Japan).

*Primary Examiner*—James J. Groody
*Assistant Examiner*—Michael Lee
*Attorney, Agent, or Firm*—Peter L. Michaelson; Raymond R. Moser, Jr.

[57] ABSTRACT

An output from a solid state image sensing device spatially modulated by a color filter is A/D converted and stored in a field memory. Digital signals read from the field memory during electronic zooming are successively delayed by 1H period by means of first, second and third 1H delay elements connected in series. The output from the field memory and outputs from the first, second and third 1H delay elements are separated into luminance components and line sequential color components by first to fourth Y/C separating circuits, respectively. A first set of three primary color signals are calculated based on outputs from the first, second and third Y/C separating circuits, and a second set of three primary color signals are calculated based on outputs from the second, third and fourth Y/C separating circuits. Three primary color signals corresponding to a new display point formed along with the execution of the electronic zooming function are formed based on the calculated two sets of three primary color signals, and a luminance signal corresponding to the new display point is formed based on outputs from the second and third Y/C separating circuits.

16 Claims, 15 Drawing Sheets

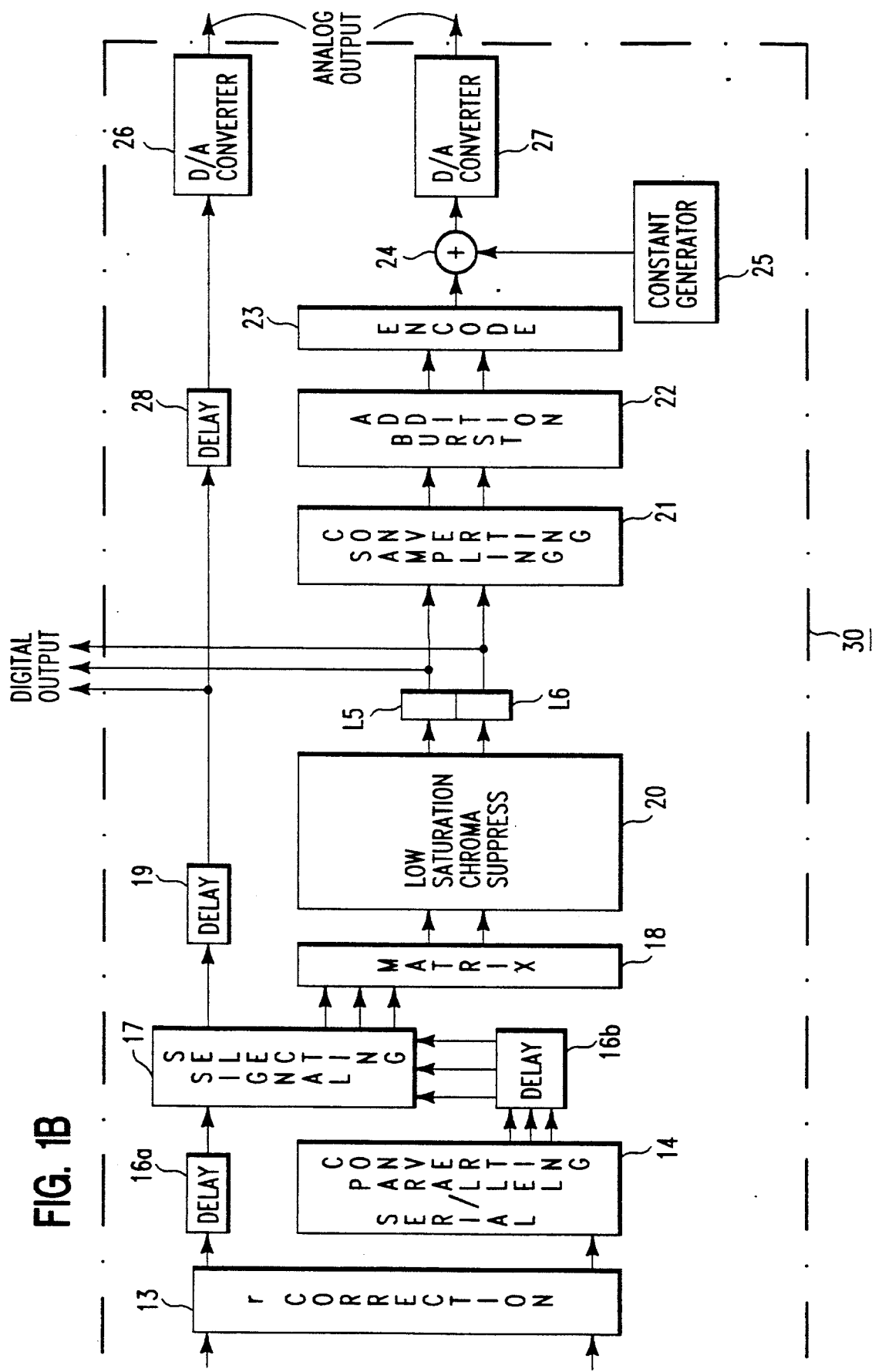

FIG.2A
COMPLEMENTARY COLOR FILTER ARRANGEMENT

| R+B | G | R+B | G |
|-----|-----|-----|-----|
| G+B | R+G | G+B | R+G |
| G | R+B | G | R+B |
| R+G | G+B | R+G | G+B |

FIG.2B
ODD FIELD IMAGE OUTPUT

| R+G+2B | R+2G | R+G+2B |
|--------|------|--------|
| 2G+B | 2R+G+B | 2G+B |

FIG.2C
EVEN FIELD IMAGE OUTPUT

| 2G+B | 2R+G+B | 2G+B |
|------|--------|------|
| R+G+2B | R+2G | R+G+2B |

INTEGRATED CIRCUIT FOR PROCESSING DIGITAL SIGNALS IN VIDEO CAMERA HAVING ELECTRONIC ZOOMING FUNCTION

BACKGROUND OF THE INVENTION

1. Field of the Invention

The present invention relates to an integrated circuit for processing signals in a video camera and, more specifically, to an integrated signal processing circuit for processing in a digital manner various signals in a video camera having an electronic zooming function.

2. Description of the Background Art

A conventional digital video camera includes two integrated circuits, that is, an integrated circuit for processing luminance signals and an integrated circuit for processing color signals, for processing various signals therein. The integrated circuit for processing luminance signals requires two 1H (H represents horizontal period of a video signal) delay elements for effecting digital signal processing such as contour enhancement in vertical direction of the image. The integrated circuit for processing color signals also requires two 1H delay elements for effecting digital signal processing such as simultaneous processing of color signals.

Since such a 1H delay element is generally formed of a random access memory (RAM), it occupies a large area in the integrated circuit. Therefore, a technique allowing sharing of two 1H delay elements for luminance signal processing and color signal processing has been proposed, for example, in National Technical Report volume 36, No. 3, pp 85 to 90, June 1990.

In recent video cameras (especially in VTRs containing cameras, also called camcoders), an electronic zooming function is employed in addition to the conventional optical zooming function in order to improve magnification rate of zooming as a whole, while keeping the magnification rate of the optical zoom lens itself constant. The electronic zooming function includes interpolation of video information of a selected area of the picked up image in the vertical and horizontal directions to provide an enlarged image. It is also used for a so called hand shake correcting control in which fluctuation of peripheral portions of the picked up image caused by hand shake is eliminated to record stable image at the central area.

In order to realize such an electronic zooming function, a field memory for temporarily storing image signal outputs from an image sensing device is provided in a preceding stage of the above mentioned luminance signal and color signal processing circuits, and an integrated circuit for effecting interpolation for synthesizing image information of new display points which become necessary to effect electronic zooming is provided in the succeeding stage of the luminance signal and color signal processing circuits. The integrated circuit for interpolation further requires two more 1H delay elements to effect interpolation.

Namely, in the digital video cameral such as disclosed in the above mentioned document, a total of three integrated circuits are necessary for luminance signal processing, color signal processing and interpolation so as to realize the electronic zooming function, which prevents a reduction in size of the camera itself.

Therefore, it is necessary to incorporate various functions of these three integrated circuits into one integrated circuit so as to reduce the size of the signal processing system in the video camera. However, since two 1H delay elements (RAMs) are necessary for processing luminance signals and color signals and two more 1H delay elements are necessary for interpolation, four 1H delay elements (RAMs) must be provided in one integrated circuit in order to process all of the above mentioned signals in one integrated circuit. The 1H delay element (RAM) itself occupies a very large area on a chip as shown in the chip layout of FIG. 5(a) in page 89 of the aforementioned document, and therefore, provision of four 1H delay elements (RAMs) for processing various signals makes difficult one-chip implementation of the signal processing system of a digital video camera.

SUMMARY OF THE INVENTION

An object of the present invention is to make compact a video camera having an electronic zooming function.

Another object of the present invention is to realize one chip implementation of a signal processing system in a digital video camera.

A further object of the present invention is to enable general processing of luminance signals and color signals and interpolation for electronic zooming by sharing 1H delay elements in an integrated circuit for digital signal processing in a video camera.

Briefly stated, the present invention provides an integrated circuit for digital signal processing for a video camera capable of carrying out an electronic zooming function in which an output from a solid state image sensing device spatially modulated by a color filter is A/D converted to be temporarily stored in a field memory, and the stored digital signal is read for zooming, which includes first, second and third 1H delay elements, first, second, third and fourth luminance/color signal separating circuits, a first red-green-blue (RGB) synthesizing circuit, a second RGB synthesizing circuit, interpolation circuits for the luminance signal, and interpolation circuits for the color signal. First, second and third 1H delay elements successively provide delay of 1 horizontal period to the digital signal read from the field memory. The first, second, third and fourth Y/C separating circuits separate the digital signal and outputs from the first, second and third 1H delay elements, respectively, into luminance components and line sequential color components. The first RGB synthesizing circuit forms a first set of three primary color signals from the color component outputs from the first, second and third Y/C separating circuits. The second RGB synthesizing circuit forms a second set of three primary color signals from the color component outputs from the second, third and fourth Y/C separating circuits. The interpolation circuits for the luminance signal synthesize a luminance signal corresponding to a new display point which should be formed along with the execution of the electronic zooming function, from the outputs of the first and second delay elements. The interpolation circuits for the color signal synthesize three primary color signals corresponding to the new display point which should be formed along with the execution of the electronic zooming function, from the first and second sets of three primary color signals.

Therefore, a main advantage of the present invention is that one chip implementation of the signal processing system of a digital video camera is made possible, since signal processing including an electronic zooming function can be carried out with the number of 1H delay elements reduced to three.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1B is a block diagram showing a succeeding stage of the integrated circuit for digital signal processing in accordance with one embodiment of the present invention.

FIGS. 2A, 2B and 2C show relation between image pickup outputs and arrangement of complementary color filters.

DESCRIPTION OF THE PREFERRED EMBODIMENTS

Figure 1A:
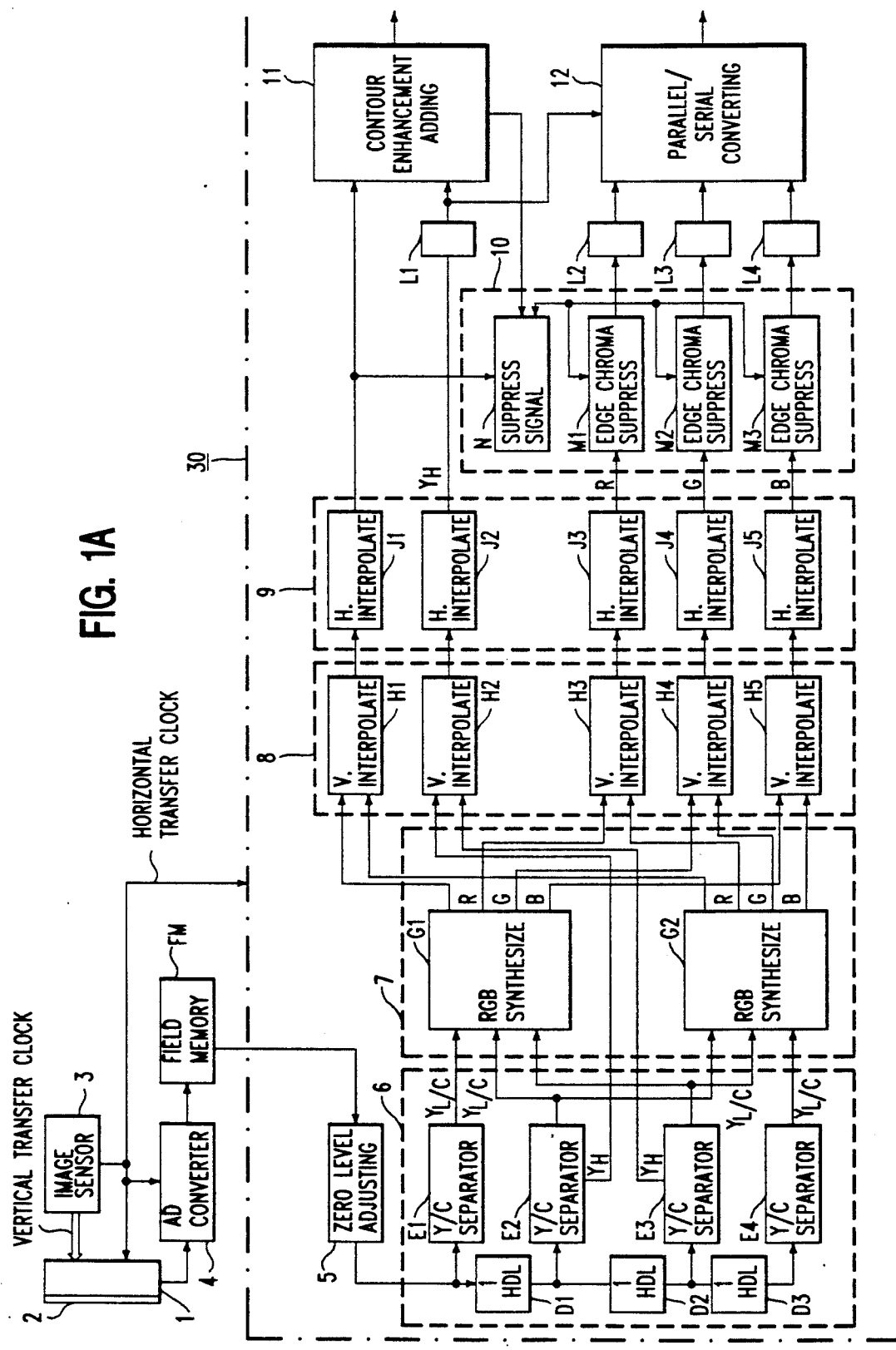
FIG. 1A is a block diagram showing a preceding stage of an integrated circuit for digital signal processing in accordance with one embodiment of the present invention.

FIGS. 1A and 1B are schematic block diagrams showing mainly a signal processing system of a digital video camera in accordance with one embodiment of the present invention, in which FIG. 1A shows a preceding stage portion of an integrated circuit for digital signal processing, and FIG. 1B shows a succeeding stage portion thereof.

Referring to FIG. 1A, a complementary color filter 2 having such an arrangement as shown in FIG. 2A is provided on a light receiving surface of a single plate type color solid state image sensing device 1. The light which has entered the light receiving surface of image sensing device 1 through complementary color filter 2 is subjected to photoelectric conversion to be turned into electric signals. The outputs provided in this manner are read from image sensing device 1 in response to horizontal and vertical transfer clocks applied from an image sensing device driving circuit 3.

More specifically, in odd numbered fields, light receiving outputs are added pixel by pixel for continuous upper and lower two lines, so that dot sequential outputs of picked up images are provided. For example, referring to upper left end of FIG. 2B, a sum of light receiving outputs provided through filter arrangements R+B and G+B at the left end of the first and second lines of FIG. 2A forms an output R+G+2B of one pixel of the picked up image, and in the same manner, sums of the light receiving outputs provided from filter arrangements of the first and second lines of FIG. 2A form outputs of the pixels of the picked up image at the upper stage of FIG. 2B. Sums of the light receiving outputs provided from the third and fourth filter arrangements of FIG. 2A form the outputs of the pixels of the picked up image at the lower stage of FIG. 2B.

In even numbered fields, light receiving outputs are added pixel by pixel for continuous upper and lower two lines, shifted by 1 line from FIG. 2B, and dot sequential outputs of picked up images are provided. The arrangement of the complementary color filter such as shown in FIG. 2A and the arrangements of the picked up image outputs from respective pixels shown in FIGS. 2B and 2C generated by spatial modulation by the filter arrangement are well known in the field of art as described in, for example, "Television Technology", November 1987, pages 26 to 37.

The dot sequential picked up image output provided by color solid state image sensing device 1 is converted into 10 bits of digital signals in synchronization with horizontal transfer clocks supplied from image sensing device driving circuit 3. The digital picked up image signals provided in this manner are once stored in the field memory FM. Then, in synchronization with the timings of signal processing incidental to electronic zooming, digital signals corresponding to the selected area in the picked up image are read and applied as input to a one chip digital integrated circuit 30.

The digital picked up image signal applied to digital integrated circuit 30 is first applied to a zero level adjusting circuit 5, and a reference level is adjusted such that an output level of optical black in the picked up image signal is at zero level. Details of zero level adjusting circuit 5 will be described later.

Then, the digital picked up image signal which has been subjected to zero level adjustment is input to an Y/C separating portion 6. The signal input to Y/C separating portion is successively input to cascade connected three 1H delay elements D1, D2 and D3. Outputs from zero level adjusting circuit 5 and from 1H delay elements D1, D2 and D3 are respectively supplied to Y/C separating circuits E1, E2, E3 and E4.

Each of Y/C separating circuits E1 to E4 separates the applied digital picked up image signal into luminance component $Y_1$, line sequential color component $C_r (=2R-G)$ or $C_b (=2B-G)$, and outputs the same. The digital delay outputs from 1H delay elements D1 and D2 are provided as they are through Y/C separating circuits E2 and E3, respectively, and supplied to the succeeding stage circuitry as spatially modulated luminance signal $Y_H$ by color filter 2.

The luminance signal $Y_L$ is provided by calculating an average of a signal which is a mean of picked up image outputs of (N−1)th pixel and (N+1)th pixel in the horizontal direction, and the picked up image output of the Nth pixel, as will be described later with reference to FIG. 4. The luminance signal $Y_H$ is substantially the picked up image output itself of the solid state image sensing device.

More specifically, the picked up image output $Y_H$ has its band restricted to some extent by means of a low pass filter L1, which will be described later, and the color component of the solid state image sensing device only is removed, thereby providing a luminance signal. The luminance signal $Y_L$ substantially corresponds to a signal provided by significantly restricting the band of the picked up image output $Y_H$ by means of the low pass filter, and it is used as a base signal for synthesizing RGB signals. Details of Y/C separating circuit 6 will be described later.

Each of 1H delay elements D1, D2 and D3 is formed by a RAM having a capacity of (signal bit width)×(number of pixels in 1 line).

An output from zero level adjusting circuit 5 is input to 1H delay element D1; an output from 1H delay element D1 is input to 1H delay element D2; an output from 1H delay element D2 is input to 1H delay element D3, and respective delay elements output the input signals after the lapse of 1H period.

The luminance component signals $Y_L$ and the line sequential color component signal $C_r$ or $C_b$ of four lines supplied from Y/C separating portion 6 are provided to an RGB synthesizing portion 7 of the next stage. RGB synthesizing portion 7 includes two RGB synthesizing circuits G1 and G2 having the same structure.

RGB synthesizing circuit G1 receives luminance component signals $Y_L$ and line sequential color component signal $C_r$ or $C_b$ of continuous three lines applied from Y/C separating circuits E1, E2 and E3 and forms and provides three primary color signals of R, G and B and a contour enhancement signal in the vertical direction.

RGB synthesizing circuit G2 receives luminance component signals $Y_L$ and line sequential color component signal $C_r$ or $C_b$ of continuous three lines applied from Y/C separating circuits E2, E3 and E4, and forms and provides three primary color signals of R, G and B and a contour enhancement signal in the vertical direction. Therefore, two sets of three primary color signals and two vertical contour enhancement signals corresponding to continuous two lines of the reproduced image are supplied from RGB synthesizing portion 7. Details of RGB synthesizing circuit will be described later.

These two sets of three primary color signals and two vertical contour enhancement signals as well as two luminance signals $Y_H$ supplied from Y/C separating portion 6 are input to a vertical interpolating portion 8 of the next stage. Vertical interpolating portion 8 is comprised of five vertical interpolating circuits H1 to H5 having the same structure.

Each of the vertical interpolating circuit mixes signals of the same type on upper and lower two lines on the picked up image at a prescribed ratio, and forms vertical interpolation signals corresponding to the new display points, in order to interpolate video display information in the vertical direction during electronic zooming. Vertical interpolating circuit H1 provides a vertical interpolation signal of the vertical contour enhancement signal; vertical interpolating circuit H2 provides a vertical interpolation signal of luminance signal $Y_H$ vertical interpolating circuit H3 provides a vertical interpolation signal of R signal; vertical interpolating circuit H4 provides a vertical interpolation signal of G signal; and vertical interpolating circuit H5 provides a vertical interpolation signal of B signal. Details of the vertical interpolating circuits will be described later.

The five different vertical interpolation signals from vertical interpolating portion 8 are input to a horizontal interpolating portion 9 of the next stage. The horizontal interpolating portion 9 is comprised of five horizontal interpolating circuits J1 to J5 having the same structure.

Each of the horizontal interpolating circuits mixes preceding and succeeding signals of the same type at a prescribed ratio to form horizontal interpolating signals corresponding to the new display points, so as to interpolate video display information in the horizontal direction during electronic zooming. Horizontal interpolation circuit J1 provides a horizontal interpolation signal of the vertical contour enhancement signal; horizontal interpolating circuit J2 provides a horizontal interpolation signal of the luminance signal $Y_H$; horizontal interpolating circuit J3 provides a horizontal interpolation signal of R signal; horizontal interpolating circuit J4 provides a horizontal interpolation signal of G signal; and horizontal interpolating circuit J5 provides a horizontal interpolation signal of B signal. Details of the horizontal interpolating circuits will be described later.

In this manner, out of the five different signals which have been subjected to vertical and horizontal interpolation supplied from horizontal interpolating portion 9, three primary color signals R, G and B are input to an edge chroma suppressing portion 10. Edge chroma suppressing portion 10 includes a suppression control signal generating circuit N and edge chroma suppressing circuits M1 to M3. The aforementioned three primary color signals R, G and B are input to edge chroma suppressing circuits M1, M2 and M3, respectively. Suppression control signal generating circuit N receives the vertical contour enhancement signal supplied from horizontal interpolating portion 9 and a horizontal contour enhancement signal supplied from a contour enhancement adding circuit 11 which will be described later, detects uncorrelated portion in vertical and horizontal directions of luminance signal $Y_H$, generates a suppression control signal and applies this signal to edge chroma suppressing circuits M1 to M3. Each edge chroma suppressing circuit controls an output gain thereof in response to the suppression control signal. Consequently, blurs of colors at portions having luminance in the horizontal and vertical directions changed abruptly on the picked up image can be prevented. Details of the edge chroma suppressing portion 10 will be described later.

The vertical contour enhancement signal supplied from horizontal interpolating portion 9 is applied to contour enhancement adding circuit 11, while luminance signal $Y_H$ supplied from horizontal interpolating portion 9 has its high frequency (modulated color signal) components removed through a digital low pass filter L1 and applied to contour enhancement adding circuit 11 and to parallel/serial converting circuit 12. The three primary color signals R, G and B supplied from edge chroma suppressing portion 10 have their middle and high frequency components removed through digital low pass filters L2, L3 and L4, respectively, and applied to parallel/serial converting circuit.

Contour enhancement adding circuit 11 generates a horizontal contour enhancement signal from luminance signal $Y_H$, and adds vertical and horizontal contour enhancement signals to luminance signal $Y_H$. Details of contour enhancement adding circuit 11 will be described later.

Each of the three primary color signals R, G and B having their middle and high frequency components removed by digital low pass filters L2 to L4 has a ⅓ signal band of the luminance signal band. Therefore, by time divisionally compressing and multiplexing these three primary color signals R, G and B, the three primary color signals can be converted into a signal of one string having the same band as the luminance signal band. Because of this time divisional compression and multiplexion, the number of the circuit for effecting gamma correction on color signals can be reduced to only one, and compared with signal by signal processing of these R, G and B signals, the circuit structure can be simplified.

For this purpose, parallel/serial converting circuit 12 converts the three primary color signals whose bands restricted by low pass filters L2 to L4 into dot sequential time base compressed and multiplexed signals, and effects a process for suppressing color signal level of high luminance and low luminance portion, and a process for controlling white balance. These processes are carried out to remove a so called high light green generated on the screen when optical charges of the solid state image sensing device are saturated, and to improve S/N ratio of the color signals at low luminance portions. Details of the parallel/serial converting circuit 12 will be described later.

The luminance signal with contour enhancement signal added by contour enhancement adding circuit 11 and the three primary color signals which have been time divisionally multiplexed by parallel/serial converting circuit 12 are applied to a gamma correction circuit 13 of the succeeding stage shown in FIG. 1B.

By this gamma correction, gamma characteristic (providing emission luminance $L \propto V^{0.45}$, where V represents an input voltage) of the cathodes ray tube, which is a problem raised when images are to be displayed on a cathode ray tube, can be corrected.

The luminance signal which has been subjected to gamma correction is input to a signal selecting circuit 17 through a delay circuit 16a. The time divisionally multiplexed three primary color signals which have been subjected to gamma correction are input to a serial/parallel converting circuit 14 to be converted to the original three primary color signals. The three primary color signals R, G and B have their timings accordant with the luminance signal which has passed through a delay circuit 16a for timing adjustment, by means of a delay circuit 16b, and then these signals are applied to a signal selecting circuit 17. Signal selecting circuit 17 includes sources for generating reference signals such as color bars and title signals, and selectively outputs these signals.

Three primary color signals R, G and B output from signal selecting circuit 17 are applied to a matrix circuit 18, converted to two types of color difference signals, and then applied to low saturation chroma suppression circuit 20 of the next stage. Low saturation chroma suppressing circuit 20 suppresses color difference signals of portions having low saturation, so as to prevent erroneous coloring of portions having low saturation such as white or black because of noise or the like. Details of low saturation chroma suppressing circuit 20 will be described later.

The two color difference signals suppressed by low saturation chroma suppressing circuit 20 are applied to low pass filters L5 and L6, respectively, and low frequency components only are extracted therefrom. The luminance signal output from signal selecting circuit 17 has its timing accordant with color difference signals output from low pass filters L5 and L6, by means of a delay circuit 19. The luminance signal and the color difference signals output from low pass filters L5 and L6 are provided outside the digital integrated circuit, as digital outputs.

Outputs from low pass filters L5 and L6 are also applied to a sampling converting circuit 21 and timing of sampling, that is, timing of latching data is changed, so as to enable signal processing at a frequency four times that of color subcarrier frequency $f_{SC}$ which has a different phase and frequency from the aforementioned horizontal transfer clock.

This is provided for converting, when processing frequency (driving frequency of the solid state image sensing device 1) of digital integrated circuit 30 is not four times $f_{SC}$ (4 $f_{SC}$), the sampling frequency of the color difference signal from the driving frequency of the solid state image sensing device to 4 $f_{SC}$, since it is advantageous to carry out color encoding process of the succeeding stage at a frequency four times that of color subcarrier, that is, $f_{SC}$, so as to make compact the circuit scale.

Outputs from sampling converting circuit 21 are applied to a burst adding circuit 22, in which reference level signals corresponding to a burst signal are added. The color difference signals with the reference level signals added thereto are applied to an encoding circuit 23 and are subjected to quadrature phase modulation. Details of burst adding circuit 22 and encoding circuit 23 will be described later.

A modulated output from encoding circuit 23 is applied to one input of an adding circuit 24. An output from a constant generating circuit 25 is applied to the other input of adding circuit 24 to be added to the aforementioned modulated output. An output from adding circuit 24 is applied to a D/A converting circuit 27 to be converted into an analog modulated color signal. Meanwhile, an output from delay circuit 19 has its timing made accordant with an output from adding circuit 24 by means of a delay circuit 28, applied to D/A converting circuit 26, and is converted to an analog luminance signal. As described above, digital integrated circuit 30 outputs analog luminance signal and modulating color signal.

In this embodiment, after analog conversion by D/A converting circuit 26, a synchronizing signal is added to the luminance signal by means of a circuit, not shown. Consequently, sufficiently large dynamic range of a video signal level can be ensured when digital processing is carried out in digital integrated circuit 30.

The various components of the embodiment shown in FIGS. 1A and 1B will be described in detail.

Zero Level Adjusting Circuit

Figure 3:
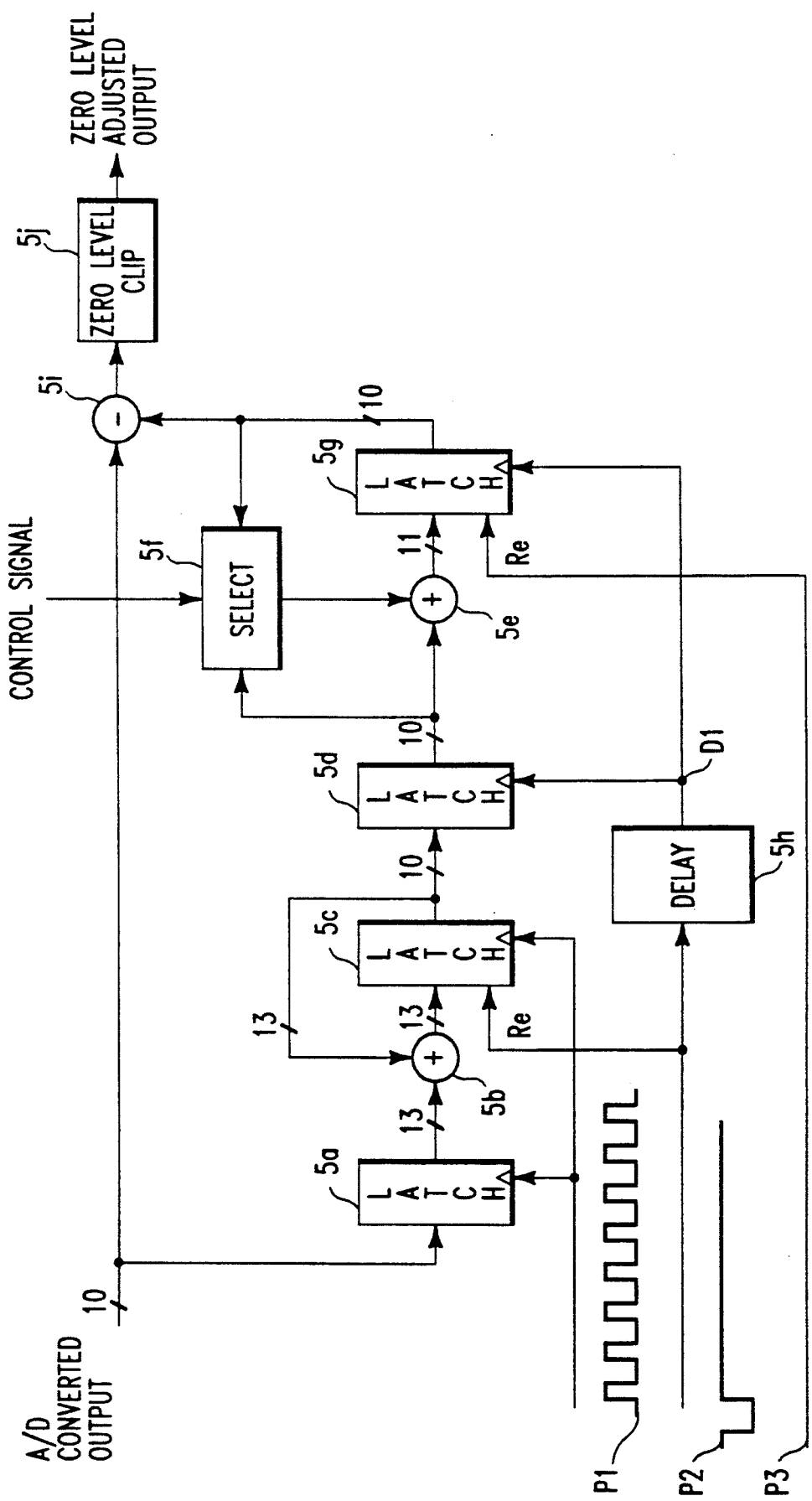
FIG. 3 is a block diagram showing a structure of a zero level adjusting circuit shown in FIG. 1A.

FIG. 3 is a block diagram showing a structure of zero level adjusting circuit 5 shown in FIG. 1A. Zero level adjusting circuit 5 adjusts a reference level of a digital picked up image signal read from field memory FM so that an output level of optical black included in the picked up image signal at the terminating portion of each horizontal scanning period is at a zero level.

First, 10 bits of digital image signal which has been read from field memory FM and input to zero level adjusting circuit 5 is applied to a latch circuit 5a and to a positive input of a subtracting circuit 5i. Latch circuit 5a successively latches picked up signal levels corresponding to 8 sample points near the center of the optical black portion of the picked up signal, in synchronization with latch pulses P1 supplied from a signal source, not shown. The data latched by latch circuit 5a are successively applied to one input of an adder circuit 5b.

A latch circuit 5c has been reset in advance by a latch pulse P2 supplied from a signal source, not shown, immediately before latch pulse P1, and successively latches outputs from adder circuit 5b in response to latch pulses P1. The data latched by latch circuit 5c are successively applied to the other input of adder circuit 5b. More specifically, adder circuit 5b successively adds outputs from latch circuits 5a and 5c so as to successively accumulate signal levels at 8 sample points of the image signal, and the result of accumulation is latched in latch circuit 5c.

After the completion of accumulation of 8 samples, a latch circuit 5d latches as a mean value, upper 10 bits of the accumulated value except lower 3 bits of 13 bits of accumulated value which has been latched in latch circuit 5c, in response to a latch pulse D1 which is provided by providing a delay of one horizontal period to latch pulse P2 by means of a delay circuit 5h.

The mean value data latched in latch circuit 5d is applied to one input of a selecting circuit 5f and to one input of an adder circuit 5e. In order to make even the optical black level in the vertical direction, selecting circuit 5f selects an output from latch circuit 5d only once at a start of accumulation, namely, only when the picked up image output of the optical black portion is supplied for the first time after the vertical blanking period, at a head portion of each field, in response to a control signal supplied from a signal source, not shown. An output from adder circuit 5e is applied to a latch circuit 5g which has been reset in advance by a latch pulse P3 supplied from a signal source, not shown, at a head portion of each field, and the latched output thereof is applied to the other input of selecting circuit 5f. In the second and following accumulating operations, selecting circuit 5f selects output from latch circuit 5g and apply the same to the other input of adder circuit 5e, in response to the control signal.

Upper 10 bits except lower 1 bit of accumulation output from adder circuit 5e is latched by latch circuit 5g as a mean value, by the above described delayed pulse D1. The output from latch circuit 5g is applied to a negative input of subtracting circuit 5i as a zero level reference value.

By the above described operation, the level of the first optical black portion after the end of vertical blanking period is output from latch circuit 5g, and thereafter, a mean value of the level of the optical black portion of the picked up image output supplied at every 1H period and the level which has been latched in latch circuit 5g immediately before is output. By taking a mean value of the level of the optical black portion and the level of the optical black portion of the immediately preceding horizontal line, variations of the optical black level in the vertical direction can be reduced.

Subtracting circuit 5i subtracts the aforementioned zero level reference value from a digital picked up image signal read from field memory FM, and an output thereof is input to a zero level clip circuit 5j. Zero level clip circuit 5j clips unnecessary negative subtraction output at zero level, and provides 10 bits of zero level adjusted output. Therefore, zero level adjusted output with the signal level of the optical black portion of the picked up image signal adjusted at the zero level is supplied from zero level adjusting circuit 5 of FIG. 3 to a Y/C separating portion 6 of the succeeding stage.

Y/C Separating Circuit

Figure 4:
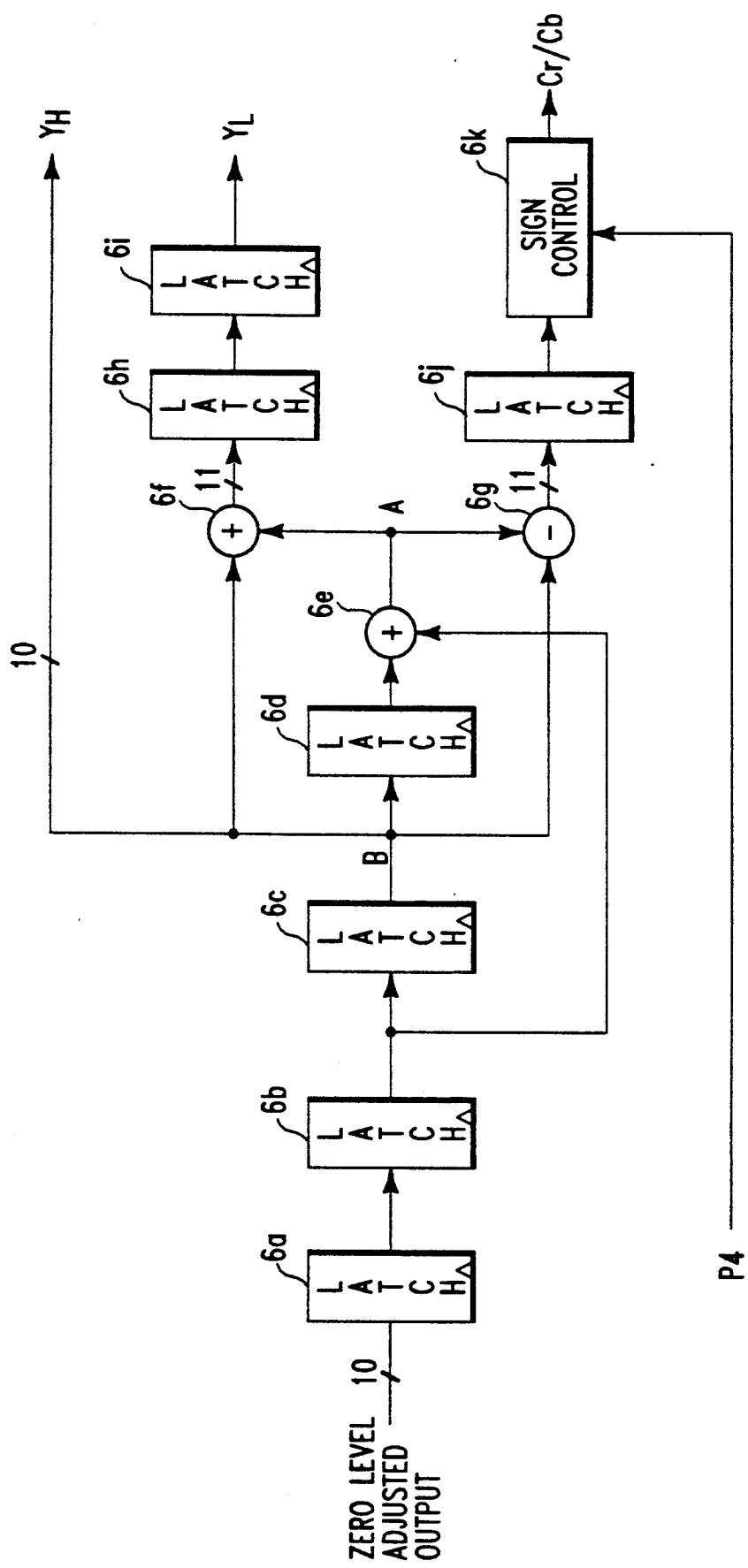
FIG. 4 is a block diagram showing a structure of the Y/C separating circuit shown in FIG. 1A.

FIG. 4 is a block diagram showing a Y/C separating circuit E2 shown in FIG. 1A. A Y/C separating circuit E3 has the same structure as Y/C separating circuit E2. Y/C separating circuits E1 and E4 have the same structure as Y/C separating circuit E2 except that a picked up image signal output $Y_H$ is not provided.

The Y/C separating circuit outputs a spatially modulated high frequency luminance signal $Y_H$, and a low frequency luminance component $Y_L$ and a line sequential color component $C_r$ or $C_b$. Each of these output signals is directly derived from the picked up image signal.

Referring to FIG. 4, the zero level adjusted output supplied from zero level adjusting circuit 5 of FIG. 3 is successively latched in cascade connected latch circuits 6a to 6d. The outputs from latch circuits 6b and 6d are applied to an input of an adder circuit 6e and added to each other to provide a mean value. The mean output A from adder circuit 6e corresponds to an output B of a latch circuit 6c. The mean output A is applied to one input of each of adder circuit 6f and subtracting circuit 6g. The output B from latch circuit 6c is applied to the other input of each of adder circuit 6f and subtracting circuit 6g, and it is supplied as it is as a high frequency luminance component $Y_H$.

Consequently, a signal $Y_L = 2R + 2B + 3G$ which corresponds to the sum of the above outputs A and B is output from adder circuit 6f as the low frequency luminance component $Y_L$. A signal $\pm C_r = (2R - G)$ or $\pm C_b = (2B - G)$ which corresponds to the difference between the above outputs A and B is line sequentially output as a color component. The positive and negative signs of color components $C_r$ and $C_b$ are inverted dot sequentially.

Luminance component $Y_L$ is output with a delay of 2 clock periods through latch circuits 6h and 6i. Meanwhile, line sequential signals $\pm C_r$ and $\pm C_b$ are applied to a sign control circuit 6k through latch circuit 6j. Sign control circuit 6k settles the situation in which signs of color components are inverted dot sequentially, by means of pulses P4 supplied from a signal source, not shown. Consequently, $C_r$ or $C_b$ is line sequentially output as the color component from sign control circuit 6k.

RGB Synthesizing Circuit

Figure 5:
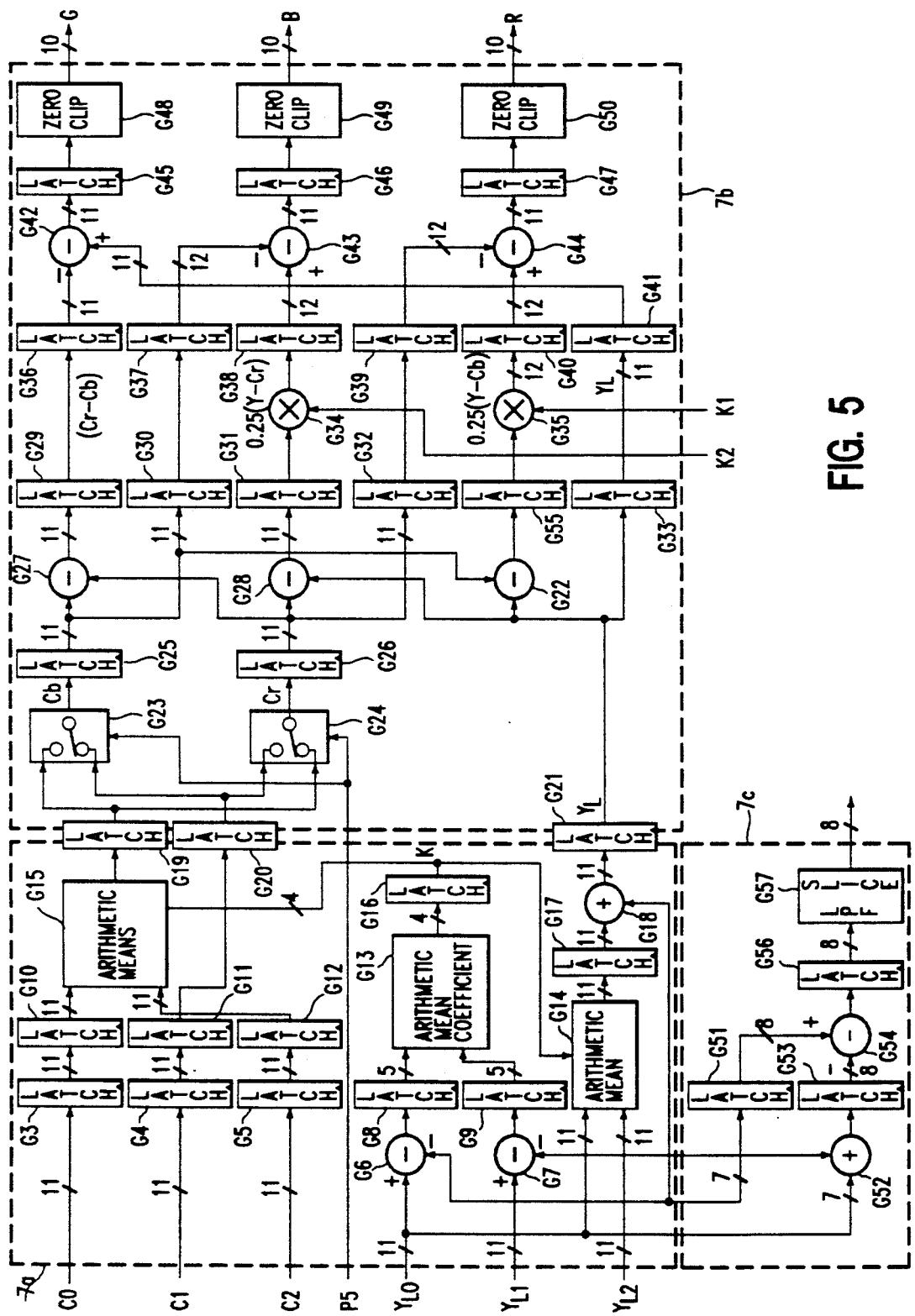
FIG. 5 is a block diagram showing a structure of the RGB synthesizing circuit shown in FIG. 1A.

FIG. 5 is a block diagram showing a structure of a RGB synthesizing circuit G1 shown in FIG. 1A. RGB synthesizing circuit G2 has the same structure as RGB synthesizing circuit G1.

RGB synthesizing circuit G1 includes a circuit 7a for effecting simultaneous processing of line sequential color signals, an RGB synthesizing processing circuit 7b, and a vertical contour enhancement signal generating circuit 7c.

First, circuit 7a for effecting simultaneous processing synthesizes color information corresponding to video display points on a first line based on color component information of the 0th line and the second line, in view of the fact that the types of color component information of the 0th and 2nd lines are the same and that they are different from the type of color component information of the first line. The synthesizing operation is effected based on correlation of luminance signals, as will be described later.

More specifically, color component C0 of the 0th line is input through latch circuits G3 and G10 to an arithmetic mean calculating circuit G15. Color component C2 of the second line is input through latch circuits G5 and G12 to arithmetic mean calculating circuit G15. Further, color component C1 of the first line is input through latch circuits G4 and G11 to a latch circuit G20.

In order to determine a coefficient of arithmetic mean, a synthesized luminance component $Y_{L1}$ of the first line is subtracted from synthesized luminance component $Y_{L0}$ of the 0th line in a subtracting circuit G6, so that a difference between luminance signals of upper and lower neighboring lines on the upper side of the first line is calculated. Synthesized luminance signal $Y_{L2}$ of the second line is subtracted from synthesized luminance signal $Y_{L1}$ of the first line in a subtracting circuit G7, so that a difference between luminance signals of upper and lower neighboring lines on the lower side of the first line is calculated.

Upper 5 bits of the provided two difference signals are latched in latch circuits G8 and G9, respectively, and latched outputs are applied to an arithmetic mean coefficient calculating circuit G13. Arithmetic mean coefficient calculating circuit G13 calculates 4 bits of arithmetic mean coefficient K corresponding to the difference between the difference signal levels of the upper side and of the lower side of the first line, and the coefficient K is latched by a latch circuit G16.

The above mentioned arithmetic mean calculating circuit G15 effects arithmetic mean calculating process of input signals of the 0th and 2nd lines in accordance with the arithmetic mean coefficient K and applies the result to a latch circuit G19.

Therefore, two different types of color components are simultaneously processed and applied to latch circuits G19 and G20. However, since types of color information of color components to be latched are switched line by line, signals must be selectively switched by providing a switching circuit in the succeeding stage, so that color information of the same type is supplied to the same signal path.

This also applies to luminance signals. Namely, luminance signals $Y_{L0}$ and $Y_{L2}$ of the 0th and 2nd lines are subjected to arithmetic mean calculation in accordance with the arithmetic mean coefficient K by an arithmetic mean calculating circuit G14. The result of arithmetic 10 mean calculation is latched by a latch circuit G17, and it is added to luminance signal $Y_{L1}$ of the first line by means of an adder circuit G18. Upper 11 bits of resulting 12 bits of adder output are input to a latch circuit G21, a mean value is calculated therein, and in this manner, synthesized luminance component $Y_L$ of three lines is provided.

RGB synthesizing processing circuit 7b selects and switches simultaneously processed color components so that common color information is supplied to each signal path, and converts two types of color components $C_r$ and $C_b$ to three primary color signals of RGB.

More specifically, an output from latch circuit G19 or G20 is complementarily selected in response to a pulse P5 supplied from a signal source, not shown, having its output level inverted in line period, by means of selecting circuits G23 and G24. $C_b$ component and $C_r$ component are continuously supplied from selecting circuits G23 and G24, respectively.

$C_b$ and $C_r$ components provided in this manner are subjected to subtraction in a subtracting circuit G27 which provides a difference signal $(C_r - C_b)$, which output is successively latched by latch circuits G29 and G36.

$Y_L$ component and $C_r$ component are subjected to subtraction in a subtracting circuit G28 which provides a difference signal $(Y_L - C_r)$, and it is latched in a latch circuit G31. An output from latch circuit G31 is multiplied by a constant K2 of 0.25 in a multiplying circuit G34, and the result is latched in a latch circuit G38.

$Y_L$ component and $C_b$ component are subjected to subtraction in a subtracting circuit G22 which provides a difference signal $(Y_L - C_b)$, which output is latched in a latch circuit G55. An output from latch circuit G55 is multiplied by a constant K1 of 0.25 in a multiplying circuit G35, and the result is latched in a latch circuit G40. The latched output of latch circuit G21 is also applied to latch circuits G33 and G41 to be latched therein.

The $C_b$ component latched in latched circuit G25 is successively latched by latch circuits G30 and G37, while the $C_r$ component latched in latch circuit G26 is successively latched by latch circuits G32 and G39.

A subtracting circuit G42 carries out subtracting operation on latch outputs from latch circuits G36 and G41 and calculates the following output as a G component, which is applied to a latch circuit G45:

$$Y_L - C_r + C_b = (2R + 3G + 2B) - (2R - G) - (2B - G) = 5G$$

A subtracting circuit G43 carries out subtracting operation on latched outputs from latch circuits G37 and G38 and outputs the following output as a B component, which is applied to a latch circuit G46:

$$0.25\,(Y_L - C_r) - C_b = 0.25\,(4G + 2B) + 2B - G = 2.5B$$

A subtracting circuit G44 carries out a subtracting operation on latched outputs from latch circuits G39 and G40 and provides the following output as the R component, which is applied to a latch circuit G47:

$$0.25\,(Y_L - C_b) - C_r = 0.25\,(4G + 2R) + 2R - G = 2.5R$$

Each of the outputs from latch circuits G45, G46 and G47 is output as 10 bits of each three primary color signal G, B and R, respectively, through zero clip circuits G48, G49 and G50.

In case light of high intensity enters the image sensing device 1 and optical charges are saturated, signals A and B input to subtracting circuit 6G of FIG. 4 will be equal to each other, and therefore color components $C_r$ and $C_b$, which are outputs from subtracting circuit 6g both attain 0. Consequently, the above mentioned respective color components will be G component: $Y_L - C_r + C_b = Y_L$
B component: $0.25\,(Y_L - C_r) = 0.25\,Y_L$
R component: $0.25\,(Y_L - C_b) = 0.25\,Y_L$ Namely, the level of G component is four times that of the levels of R and B components, and therefore images will be green regardless of the color of the incident light. Such phenomenon is called high light green, which is suppressed by parallel/serial converting circuit 12, as described above.

Vertical contour enhancement signal generating circuit 7c generates a vertical contour enhancement signal, based on a difference between luminance information of an upper line and a lower line. An average of low frequency luminance components $Y_{L0}$ and $Y_{L2}$ of the 0th and 2nd lines is calculated in an adder circuit G52 and is latched in a latch circuit G53. The low frequency luminance component $Y_{L1}$ of the first line is latched in a latch circuit G51, and its output is subjected to subtracting operation together with an output from latch circuit G53, in a subtracting circuit G54. By this subtraction, a vertical contour enhancement component of the first line which changes both in positive and negative directions at a boundary of luminance change in the vertical direction is formed, and latched in a latch circuit G56. An output from latch circuit G56 is differentiated through a low pass filter and slice circuit G57 eliminating high frequency components and large amplitude components, and applied as a vertical contour enhancement signal.

Arithmetic Mean Calculating Circuit

Figure 6:
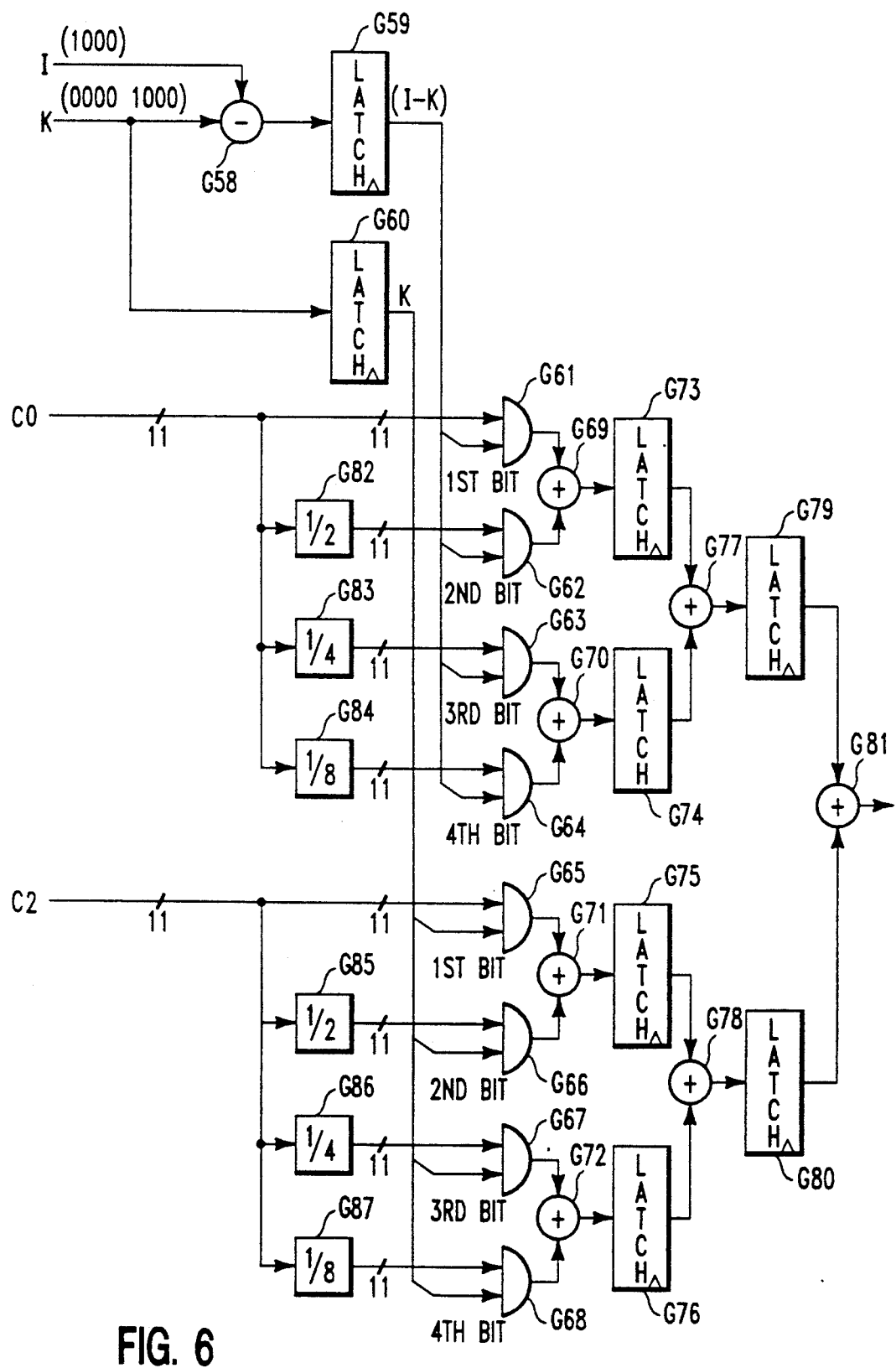
FIG. 6 is a block diagram showing a structure of an arithmetic mean calculating circuit shown in FIG. 5.

FIG. 6 is a block diagram showing a specific structure of a circuit G15 for calculating arithmetic mean of color components shown in FIG. 5. Arithmetic mean calculating circuit G14 for luminance components has the same circuit structure as the arithmetic mean calculating circuit G15.

First, 4 bits of arithmetic mean coefficient K applied from an arithmetic mean coefficient calculating circuit G13 through a latch circuit G16 of FIG. 5 is latched in a latch circuit G60 of FIG. 6, as well as to a subtracting circuit G58 in which it is subtracted from a constant I, and the constant (I-K) is latched in a latch circuit G59.

The arithmetic mean coefficient K latched in latch circuit G60 is multiplied by color component C2 of the second line, and the coefficient (I-K) latched in latch circuit G59 is multiplied by color component C0 of the 0th line. Results of multiplexion are added in the following manner so as to realize proportional distribution.

More specifically, the color component C0 of the 0th line is directly supplied to one input of an AND gate G61; ½ level color component shifted down by 1 bit by means of a shift down circuit G82 is applied to one input of an AND gate G62; ¼ level color component shifted down by 2 bits by means of a shift down circuit G83 is input to one input of an AND gate G63; and ⅛ level color component shifted down by 3 bits by means of a shift down circuit G84 is supplied to one input of an AND gate G64. Respective bit outputs of the 4 bits of coefficient (I-K) which has been latched in latch circuit G59 are supplied to the other inputs of the corresponding AND gates as control inputs of these AND gates, and multiplication is carried out bit by bit.

An output from AND gate G61 is added to an output of AND gate G62 in an adder circuit G69, and the added output is latched in a latch circuit G73. An output from AND gate G63 is added to an output from AND gate G64 in an adder circuit G70, and an added output is latched in a latch circuit G74. An output from latch circuit G73 is added to an output from latch circuit G74, and the added output is latched in a latch circuit G79.

The similar processing as described above with respect to color component C0 is effected on the color component C2 of the second line. More specifically, the color component C2 of the second line is directly supplied to one input of AND gate G65; ½ level color component shifted down by 1 bit by means of shift down circuit G85 is supplied to one input of AND gate G66; ¼ level color component shifted down by 2 bits by means of shift down circuit G86 is supplied to one input of AND gate G67; and ⅛ level color component shifted down by 3 bits by means of shift down circuit G87 is supplied to one input of AND gate G68. Meanwhile, respective bit outputs of the 4 bits of arithmetic mean coefficient K which has been latched in latch circuit G60 are supplied to the other inputs of the corresponding AND gates as control inputs to the AND gates, and multiplication is carried out bit by bit.

Outputs from AND gates G65 and G66 are added in an adder circuit G71, and the added output is latched in a latch circuit G75. Outputs from AND gates G67 and G68 are added in an adder circuit G72, and the added output is latched in a latch circuit G76. Outputs from latch circuits G75 and G76 are added in an adder circuit G78, and the added output is latched in a latch circuit G80.

Further, outputs from latch circuits G79 and G80 are added in an adder circuit G81, and an arithmetic mean output with proportional distribution is provided from adder circuit G81.

Vertical Interpolating Circuit

Figure 7:
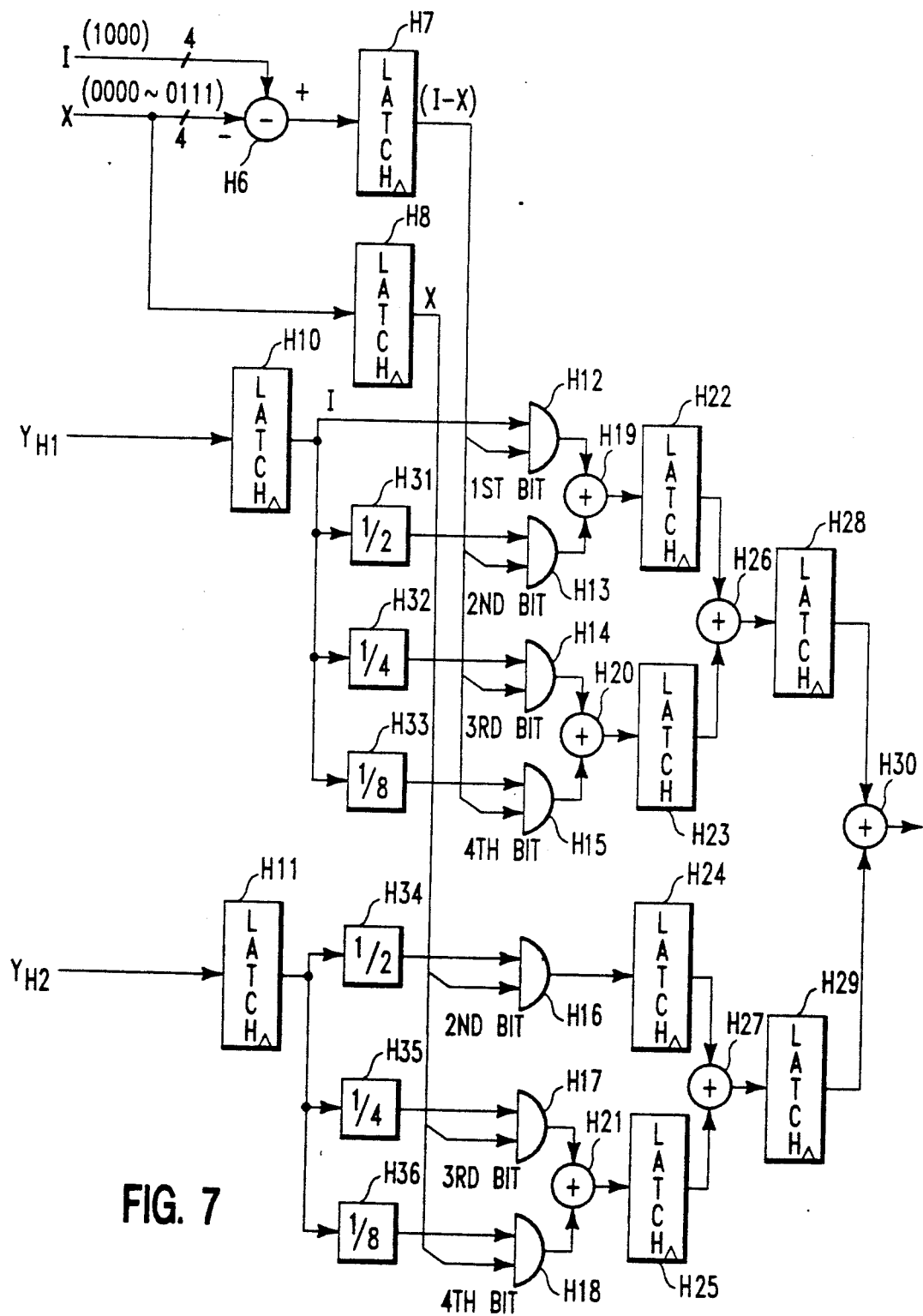
FIG. 7 is a block diagram showing a structure of a vertical interpolating circuit shown in FIG. 1A.

FIG. 7 is a block diagram showing a specific structure of a vertical interpolating circuit H2 shown in FIG. 1A. Other vertical interpolating circuits H1, H3 to H5 have the same circuit structure as vertical interpolating circuit H2.

In order to form an enlarged image by electronic zooming, the vertical interpolating circuit synthesizes new video data corresponding to display points having approximately uniform interval specified by dividing a space between image pickup points (pixels) equally into 8 in the vertical direction, in accordance with proportional distribution based on image pickup outputs at the image pickup points.

More specifically, when a new display point is positioned nearer by X/8 (where X is an integer from 0 to 7) to an upper point of picked up image than a certain point of picked up image, the interpolating circuit forms video data at the display point in accordance with proportional distribution.

First, luminance components $Y_{H1}$ and $Y_{H2}$ shifted by 1 horizontal period from each other supplied from Y/C separating circuits E2 and E3 are supplied to latch circuits H10 and H11, respectively. Consequently, luminance signals spatially successive in the vertical direction are latched.

In the sequence, the value X specifying the display point to be synthesized is latched in a latch circuit H8 and is applied to a subtracting circuit H6 in which it is subtracted from a constant I, and a result I-X is latched in a latch circuit H7.

The value X which has been latched in latch circuit H8 is multiplied with a luminance component $Y_{H2}$, the value I-X which has been latched in latch circuit H7 is multiplied with luminance component $Y_{H1}$, and the results of multiplication are added in the following manner, to realize proportional distribution.

More specifically, an output from a latch circuit H10 is directly supplied to one input of an AND gate H12; a latched output shifted down by 1 bit by means of a shift down circuit H31 is supplied to one input of an AND gate H13; latched output shifted down by 2 bits by means of a shift down circuit H32 is supplied to one input of an AND gate H14; and latched output shifted down by 3 bits by means of a shift down circuit H33 is supplied to one input of an AND gate H15.

Respective bit outputs of the 4 bits of the coefficient (I-X) which has been latched in latch circuit H7 are supplied to the other inputs of the corresponding AND gates as control inputs to these AND gates, and multiplication is carried out bit by bit.

Outputs from AND gates H12 and H13 are added in an adder circuit H19, and the added output is latched in a latch circuit H22. Outputs from AND gates H14 and H15 are added in an adder circuit H20, and the added output is latched in a latch circuit H23. Further, outputs from latch circuits H22 and H23 are added in an adder circuit H26, and the added output is latched in a latch circuit H28.

Meanwhile, an output from a latch circuit H11 is shifted down by 1 bit by means of a shift down circuit H34 to be supplied to one input of an AND gate H16; a latched output shifted down by 2 bits by means of a shift down circuit H35 is supplied to one input of an AND gate H17; and an output shifted down by 3 bits by means of a shift down circuit H36 is supplied to one input of an AND gate H18.

Lower three bits of output of the 4 bits of coefficient X which has been latched in latch circuit H8 are applied to the other inputs of the corresponding AND gates as control inputs to respective AND gates, and multiplication is carried out bit by bit.

An output from AND gate H16 is latched in a latch circuit H24. Outputs from AND gates H17 and H18 are added in an adder circuit H21, and the added output is latched in a latch circuit H25. Outputs from latch circuits H24 and H25 are added in an adder circuit H27, and added output is latched in an latch circuit H29.

Further, outputs from latch circuits H28 and H29 are added in an adder circuit H30, and synthesized video data of the new display point is output from adder circuit H30.

Horizontal Interpolating Circuit

Figure 8:
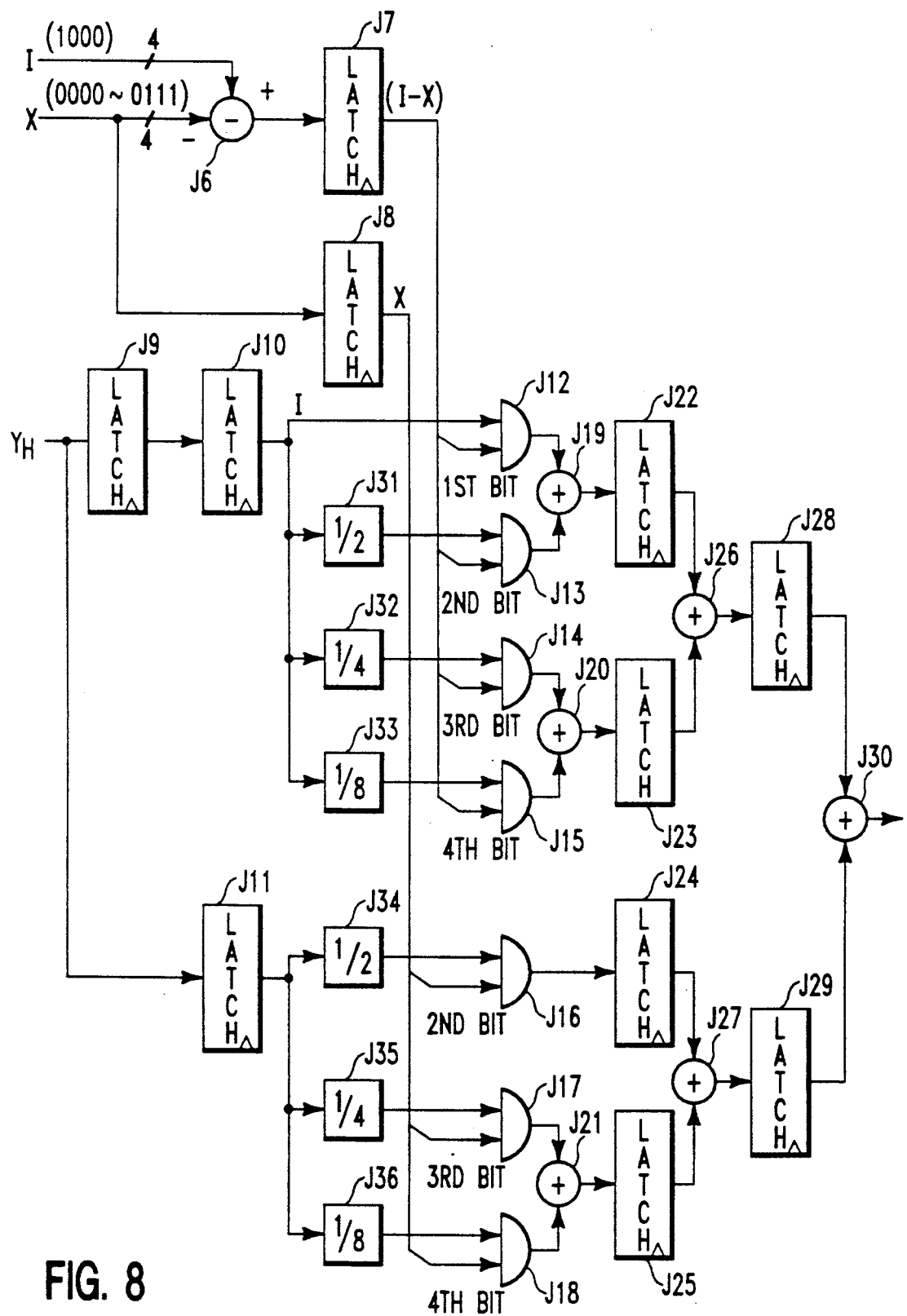
FIG. 8 is a block diagram showing a structure of a horizontal interpolating circuit shown in FIG. 1A.

FIG. 8 is a block diagram showing a structure of horizontal interpolating circuit J2 shown in FIG. 1A. Other horizontal interpolating circuits J1 and J3 to J5 have the common circuit structure as the horizontal interpolating circuit J2.

The horizontal interpolating circuit shown in FIG. 8 has the same structure as the vertical interpolating circuit shown in FIG. 7 except that luminance component $Y_H$ output from the vertical interpolating circuit of FIG. 7 is applied to a latch circuit J11 as well as to a latch circuit J10 through a latch circuit J9. Therefore, detailed description thereof is not repeated.

Contour Enhancement Adding Circuit

Figure 9:
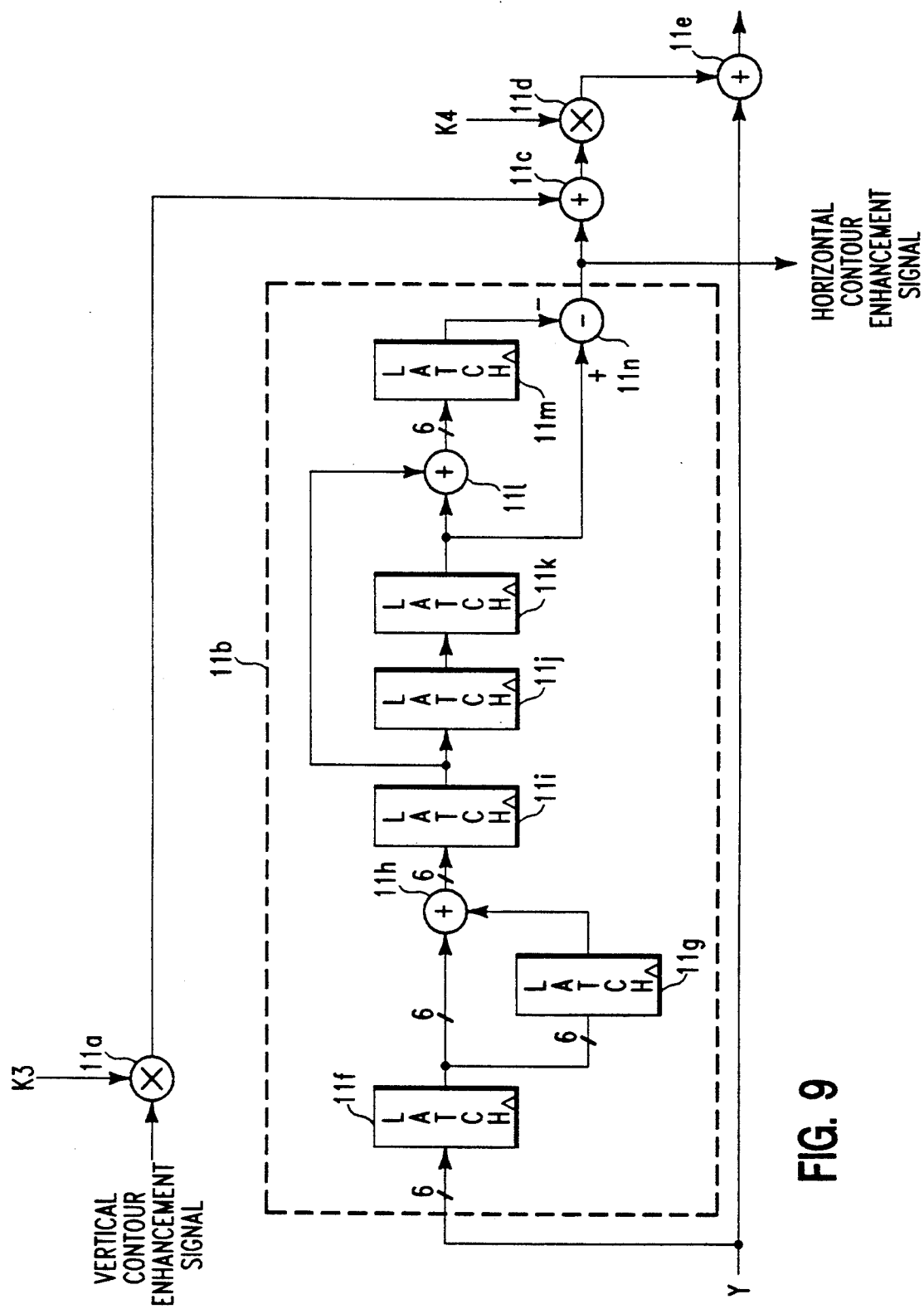
FIG. 9 is a block diagram showing a structure of a contour enhancement adding circuit shown in FIG. 1A.

FIG. 9 is a block diagram showing a specific structure of contour enhancement adding circuit 11 shown in FIG. 1A. Contour enhancement adding circuit 11 provides horizontal contour enhancement signal based on luminance signal Y with high frequency component removed, supplied from horizontal interpolating circuit J2 through a low pass filter L1, adds this signal to a vertical contour enhancement signal supplied from horizontal interpolating circuit J1 to provide a contour enhancement signal, which signal is in turn added to luminance signal Y.

Referring to FIG. 9, a luminance signal Y which has been subjected to vertical and horizontal interpolation is input to horizontal contour enhancement signal generating circuit 11b as well as to one input of an adder circuit 11e. This signal is the picked up image output itself spatially modulated by means of color filter 2, and in order to treat this as a luminance signal, picked up image outputs of preceding and succeeding two lines must be added and averaged. Therefore, luminance signal Y input to horizontal contour enhancement signal generating circuit 11b is successively supplied to latch circuits 11F and 11G, and outputs from both latch circuits are applied to inputs of an adder circuit 11a. Consequently, mean output provided from adder circuit 11h is latched as a luminance signal in a latch circuit 11i.

An output from latch circuit 11i is successively input to latch circuits 11j and 11k, and an adder circuit 11l calculates mean value of luminance signals of lines on both sides spatially with respect to an output from latch circuit 11j, which mean output is latched in a latch circuit 11m. An output from latch circuit 11j has been latched in latch circuit 11k at a latch timing in latch circuit 11n, and outputs from latch circuits 11m and 11k are applied to negative and positive inputs of a subtracting circuit 11n. Subtracting circuit 11n subtracts mean value of luminance signal of lines spatially on both sides of the central line from the luminance value of the spatially central line, and provides horizontal contour enhancement signal. The horizontal contour enhancement signal is applied to one input of an adder circuit 11c, and to a suppress control signal generating circuit N of an edge chroma suppressing portion 10, which will be described later.

The vertical contour enhancement signal which has been subjected to vertical and horizontal interpolation is applied to one input of adder circuit 11a and multiplied by a prescribed constant K3 so as to keep balance with the aforementioned horizontal contour enhancement signal, and then it is applied to the other input of adder circuit 11c. Adder circuit 11c adds vertical and horizontal contour enhancement signals and applies the result to one input of a multiplying circuit 11d. The contour enhancement signal has its level adjusted by multiplication by a constant K4 in the multiplying circuit 11d, and then it is applied to the other input of adder circuit 11e. In this manner, a contour enhancement signal is added to the luminance signal, so that a boundary of the image where luminance changes, that is, the contour of an object, is enhanced.

Edge Chroma Suppressing Circuit

Figure 10:
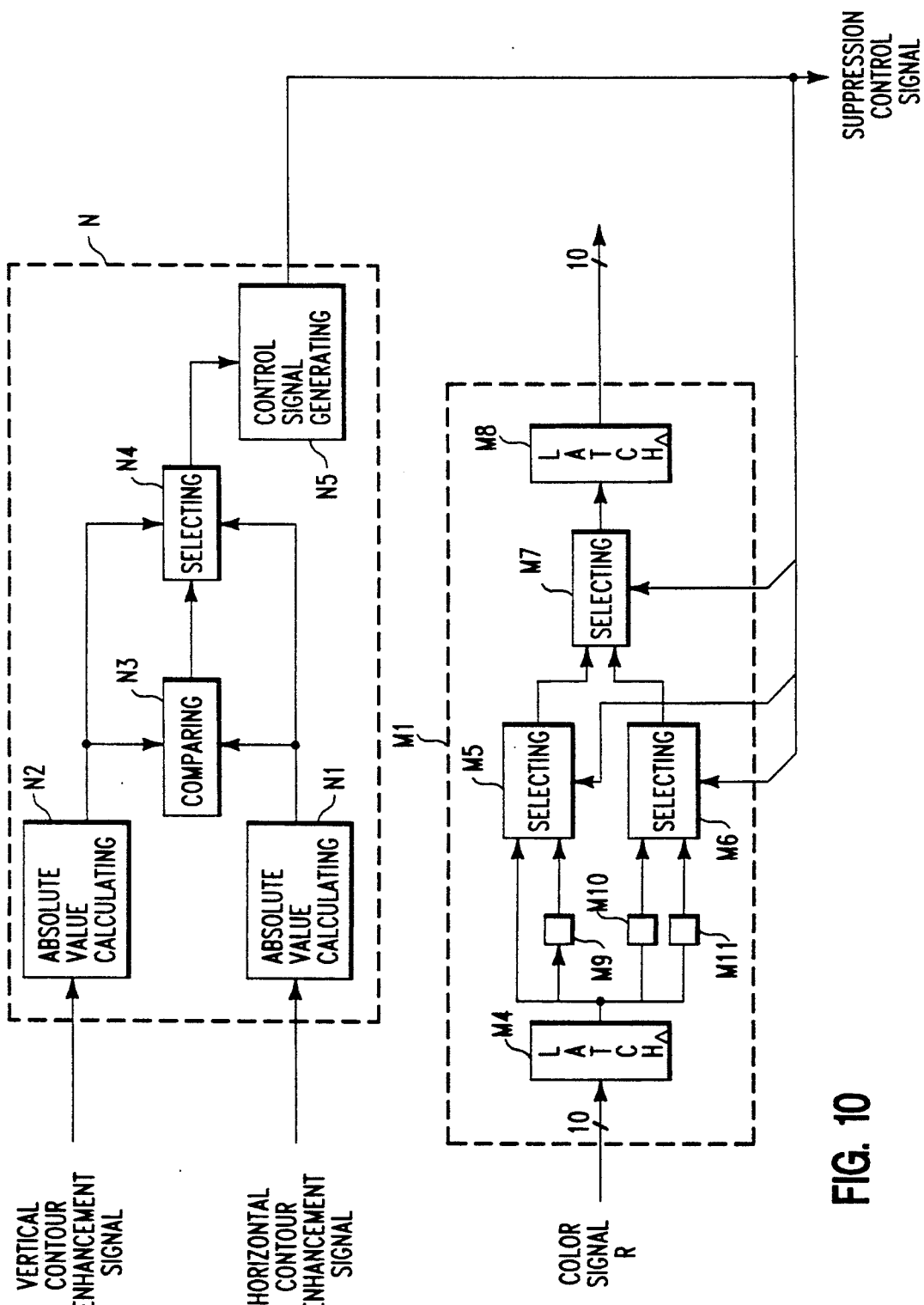
FIG. 10 is a block diagram showing a structure of an edge chroma suppressing portion shown in FIG. 1A.

FIG. 10 is a block diagram showing specific structures of suppression control signal generating circuit N and an edge chroma suppressing circuit M1 constituting edge chroma suppressing portion 10 shown in FIG. 1A. The circuit structure of edge chroma suppressing circuits M2 and M3, not shown, is the same as that of circuit M1.

Suppression control signal generating circuit N compares an absolute value of the above mentioned vertical contour enhancement signal supplied from horizontal interpolating circuit J1 with an absolute value of the above mentioned horizontal contour enhancement signal applied from contour enhancement adding circuit 11, selects larger absolute value, and generates a suppression control signal corresponding to the selected absolute value to apply this signal commonly to edge chroma suppressing circuits M1 to M3.

Each edge chroma suppressing circuit suppresses the level of each color signal in accordance with the level of the suppression control signal applied from suppression control signal generating circuit N, so that blurring of color generated at the contour portion of the reproduced image can be suppressed.

Referring to FIG. 10, the horizontal contour enhancement signal supplied from contour enhancement adding circuit 11 is input to a circuit N1 for providing an absolute value, and the absolute value is provided. The vertical contour enhancement signal supplied from horizontal interpolating circuit J1 is input to a circuit N2 for providing an absolute value, and the absolute value is provided. Outputs from these circuits are applied to inputs of a comparing circuit N3, in which level comparison is effected. A selecting circuit N4 selects larger absolute output in accordance with the output from comparing circuit N3 and applies the larger absolute value to a control signal generating circuit N5. A control signal for controlling respective edge chroma suppressing circuits is provided from control signal generating circuit N5.

A color signal R which has been subjected to vertical and horizontal interpolation supplied from horizontal interpolation circuit J3 of FIG. 1A is applied to a latch circuit M4 constituting edge chroma suppressing circuit M1 and latched therein. The latched output from latch circuit M5 is directly applied to one input of a selecting circuit M5, and an output provided by shifting down the latched output by 1 bit by means of a shift down circuit M9 is applied to the other input of selecting circuit M5. An output provided by shifting down the latched output from latch circuit M4 by 2 bits by means of a shift down circuit M10 is applied to one input of a selecting circuit M6, and an output shifted down by 3 bits by means of a shift down circuit M11 is applied to the other input of selecting circuit M6.

Each of the selecting circuits M5 and M6 selects one of the inputs in accordance with the control signal supplied from the above mentioned control signal generating circuit N5 and applies the same to an input of a selecting circuit M7. Selecting circuit M7 also selects one of the inputs in accordance with the above mentioned control signal and applies the same to a latch circuit M8. The color signal R latched in this manner is applied to a parallel/serial converting circuit 12 through a low pass filter L2 ( see FIG. 1A).

The remaining edge chroma suppressing circuits M2 and M3 process other color signals in the same manner as the edge chroma suppressing circuit M1, and therefore detailed description thereof is not repeated.

Parallel/Serial Converting Circuit

Figure 11:
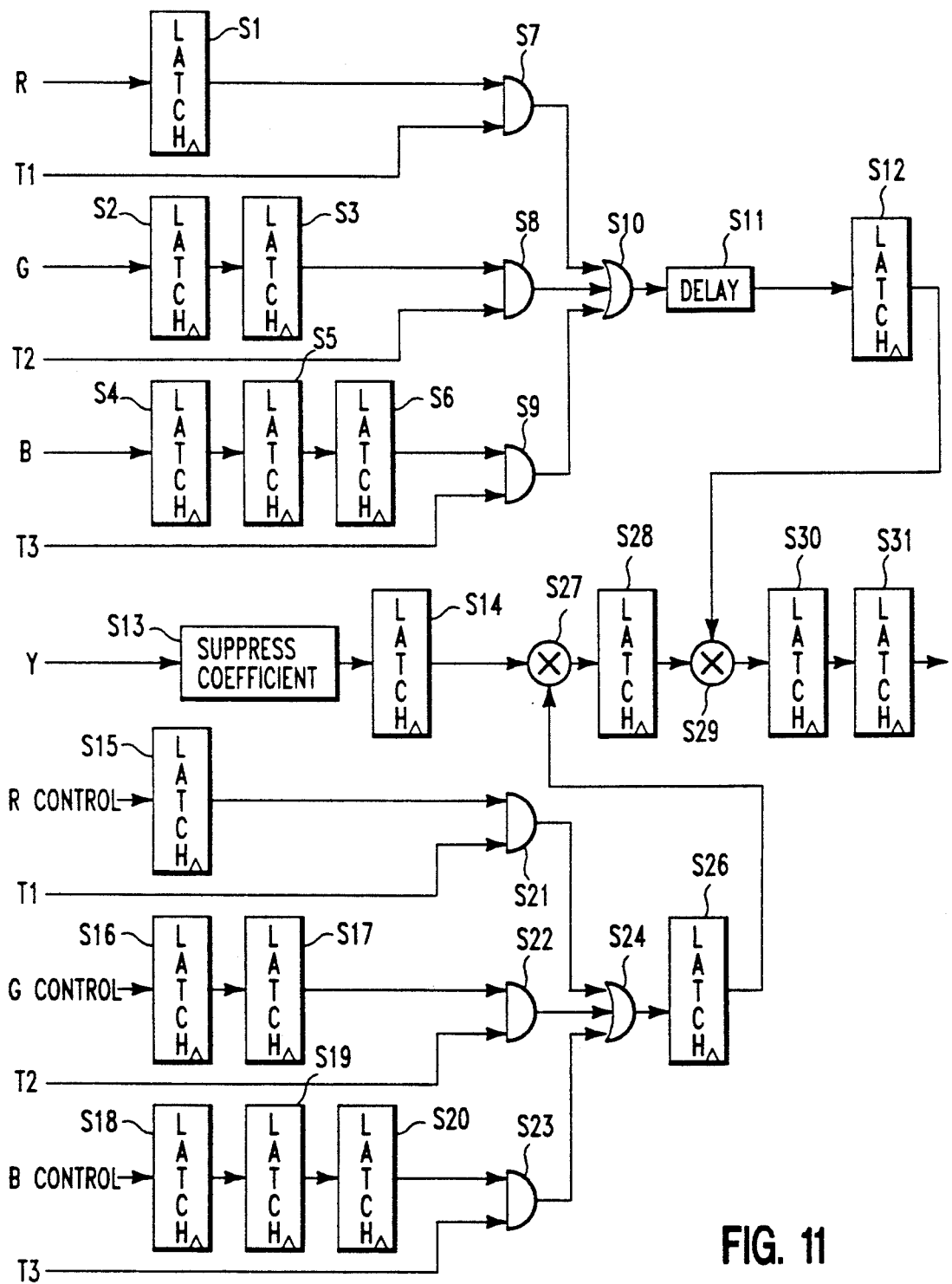
FIG. 11 is a block diagram showing a structure of a parallel/serial converting circuit shown in FIG. 1A.

FIG. 11 is a block diagram showing a specific structure of a parallel/serial converting circuit 12 shown in FIG. 1A. The parallel/serial converting circuit converts each of the three primary color signals into one string of serial signals by sampling them in three sampling periods, in view of the fact that frequency band of each of the three primary color signals may be narrow. Parallel/serial converting circuit 12 further effects adjustment of white balance, control of low illuminance chroma suppression, and control of chroma suppression at high and low luminance portions.

Referring to FIG. 11, out of three primary color signals, R signal supplied from edge chroma suppressing circuit M1 through low pass filter L2 is latched in a latch circuit S1, G signal supplied from edge chroma suppressing circuit M2 through a low pass filter L3 is successively latched in latch circuits S2 and S3, and B signal supplied from edge chroma suppressing circuit M3 through a low pass filter L4 is successively latched in latch circuits S4, S5 and S6. Outputs from latch circuits S1, S3 and S6 are supplied to one input of respective AND gates S7, S8 and S9. These AND gates S7 to S9 are successively opened in response to timing pulses T1 to T3, and three primary color signals at the same timing are successively input to an OR gate S10. A time divisionally multiplexed color signal output from OR gate S10 is supplied through a delay circuit S11 to a latch circuit S12 to be latched therein. Delay circuit S11 is provided for effecting delaying operation accordant with timings of generating chroma suppression data, which will be described later.

This embodiment is structured such that levels of three primary color signals are suppressed in high luminance portions and low luminance portions. Therefore, suppression signal generating circuit S13 receives luminance signal Y, and generates a suppression signal corresponding to the luminance signal level at the sampling timing to apply the same to a latch circuit S14.

Further, in this embodiment, control data for white balance correction and for low illuminance chroma suppression are formed for energy color signal by means of a circuit, not shown. An R control signal is applied to one input of an AND gate S21 through a latch circuit S15; a G control signal is applied to one input of an AND gate S22 through latch circuits S16 and S17; and a B control signal is applied to one input of an AND gate S23 through latch circuits S18, S19 and S20. These AND gates S21 to S23 are successively opened in response to timing pulses T1 to T3, respectively, and control signals at the same timing are successively input to an OR gate S24. A time divisionally multiplexed control signal output from OR gate S24 is applied to a latch circuit S26 to be latched therein.

The above mentioned suppression signal latched in latch circuit S14 and the above mentioned control signal latched in latch circuit S26 are multiplied in a multiplying circuit S27 and latched in latch circuit S28.

The above mentioned time divisionally multiplexed color signal latched in latch circuit S12 and the time divisionally multiplexed control signal latched in latch circuit S28 are multiplied in a multiplying circuit S29 so as to realize level suppression of three primary color signals, and the result is successively latched by latch circuits S30 and S31.

Matrix Circuit

Gamma correction circuit 13, serial/parallel converting circuit 14 and signal selecting circuit 17 shown in FIG. 1B are well known, and therefore detailed description thereof is omitted.

Figure 12:
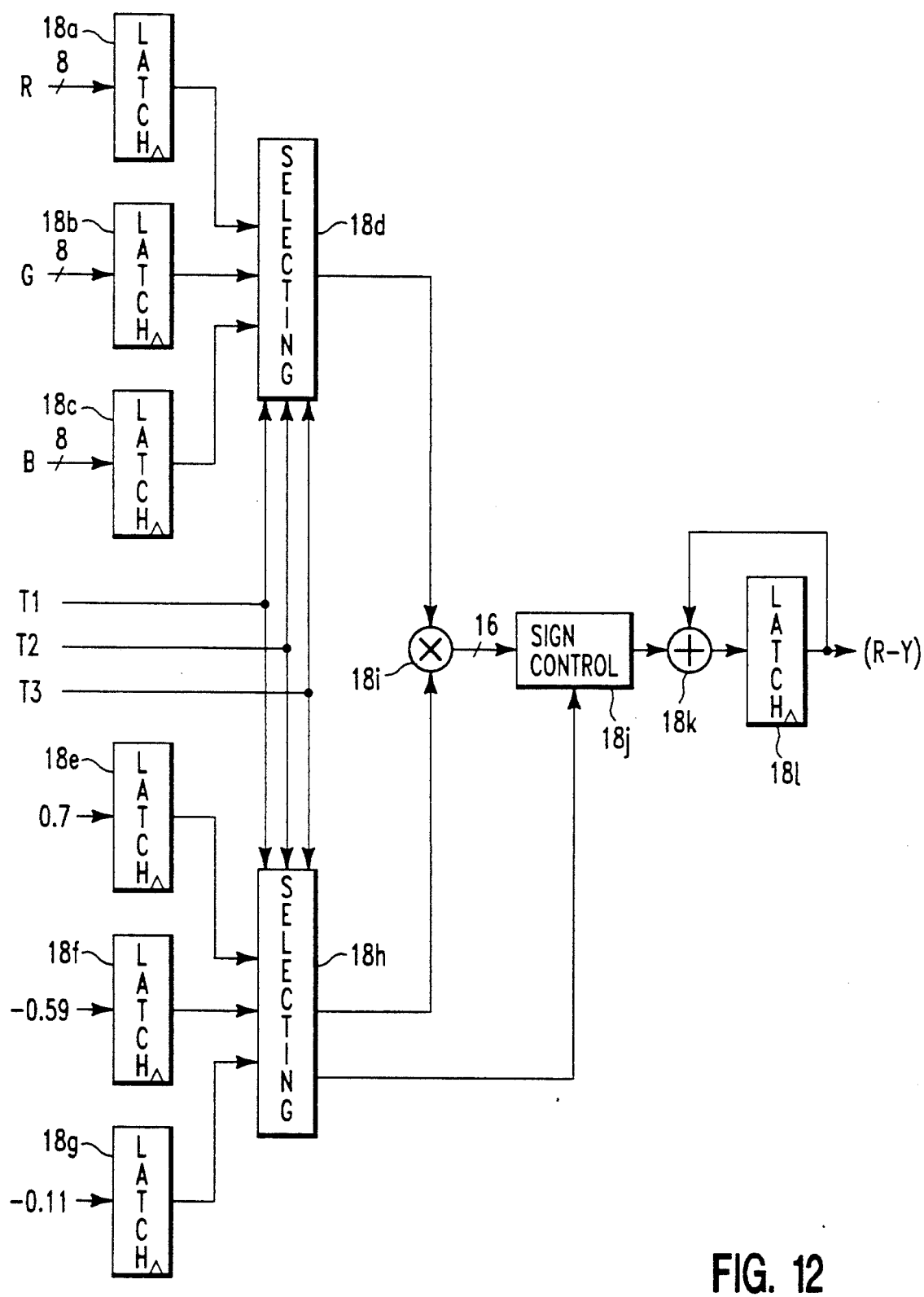
FIG. 12 is a block diagram showing a structure of a matrix circuit shown in FIG. 1B.

FIG. 12 is a block diagram showing specifically a portion for forming a color difference signal (R-Y) of a matrix circuit shown in FIG. 1B. The matrix circuit carries out a calculation 0.7R-0.59G-0.11B, in order to provide a R-Y signal.

Referring to FIG. 12, three primary color signals R, G and B latched in latch circuits 18a, 18b and 18c, respectively, are applied to a selecting circuit 18d, while coefficients 0.7, −0.59 and −0.11 corresponding to the three primary color signals latched in latch circuits 18e, 18f and 18g, respectively, are applied to a selecting circuit 18h. The color signals and the corresponding absolute value coefficients are respectively selected by selecting circuits 18d and 18h at three phase timing pulses T1, T2 and T3, which are applied to a multiplying circuit 18*i* to be multiplied.

The multiplied output from multiplying circuit 18*i* is supplied to a sign control circuit 18*j* in which a sign of the multiplication coefficient is added, and then it is input to an adder circuit 18*k*. Adder circuit 18*k* and a latch circuit 18*l* accumulate data supplied from sign control circuit 18*j* three by three, so as to effect arithmetic processing for calculating the above mentioned (R-Y) signal.

Since a matrix circuit for calculating B-Y signal has the same circuit structure except the multiplication coefficient, description thereof is not repeated.

Low Saturation Chroma Suppression Circuit

Figure 13:
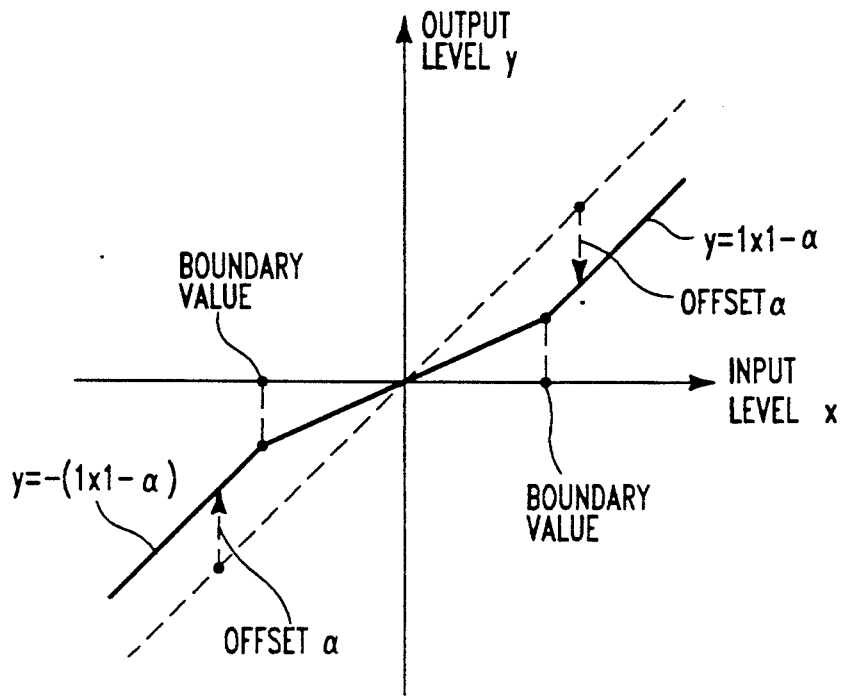
FIG. 13 illustrates the principle of low saturation chroma suppression.
Figure 14:
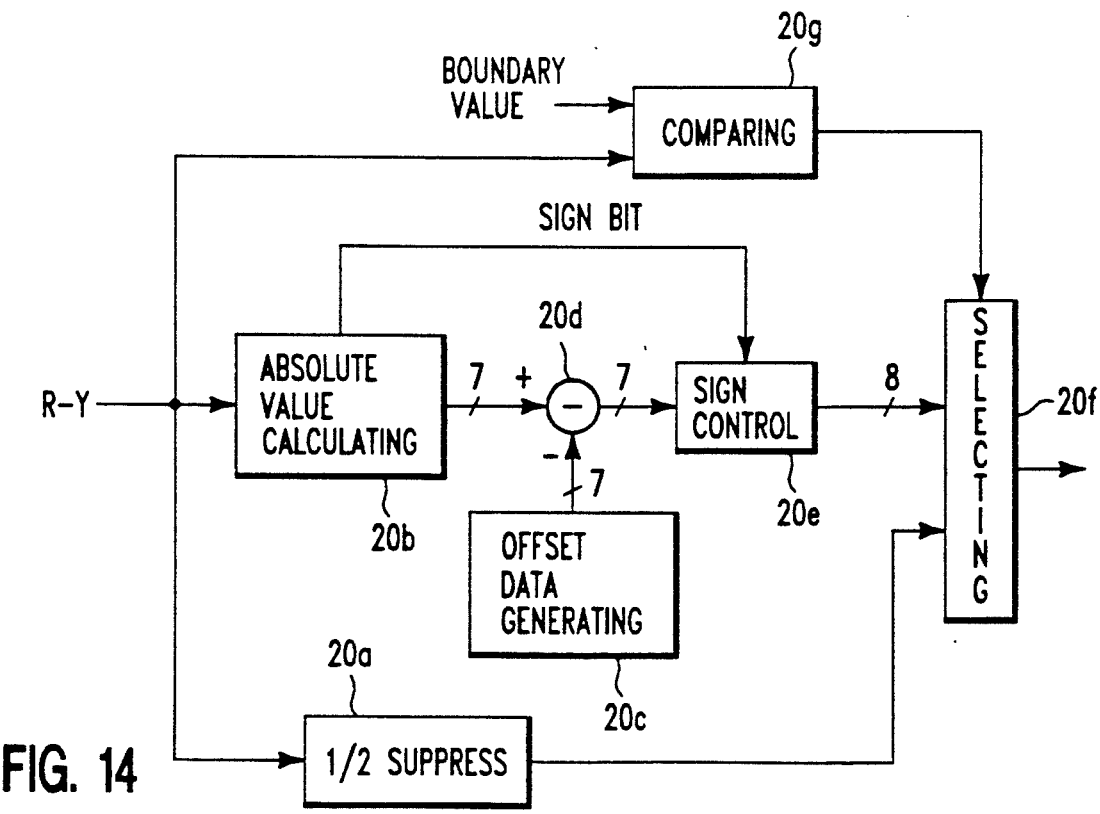
FIG. 14 is a block diagram showing a structure of the low saturation chroma suppressing circuit shown in FIG. 1B.

FIG. 13 illustrate a principle of a low saturation chroma suppression, and FIG. 14 is a block diagram showing a portion for processing the (R-Y) signal of low saturation chroma suppression circuit 20 shown in FIG. 1B.

The low saturation chroma suppression circuit suppresses the level of chroma component having small level included in a range defined by boundary values to $\frac{1}{4}$, as shown in FIG. 13. Other chroma components out of the aforementioned range are subjected to a constant offset $a$, so as to keep continuity of chroma signals.

Referring to FIG. 14, the R-Y signal is input to a $\frac{1}{4}$ suppressing circuit 20*a* for level suppression, as well as to a circuit 20*b* for providing an absolute value to provide an offset. A subtracting circuit 20*d* subtracts offset data $a$ generated from offset data generating circuit 20*c* from an output of circuit 20*b* for calculating an absolute value, and the result of subtraction is input to a sign control circuit 20*e*. Sign control circuit 20*e* provides a sign which corresponds to a sign of the input signal (R-Y), and generates an output with offset. The offset output and the suppressed output from $\frac{1}{4}$ suppressing circuit 20*a* are input to a selecting circuit 20*f*.

A comparing circuit 20*g* compares the input (R-Y) signal with a prescribed boundary value data and provides a switch control signal to selecting circuit 20*f*. In response to the switch control signal, selecting circuit 20*f* selects and supplies the output from $\frac{1}{4}$ suppressing circuit 20*a* when the input signal (R-Y) is in the range defined by the boundary values shown in FIG. 13, and otherwise, it selects and supplies the output from sign control circuit 20*e*.

Burst Adding Circuit and Encoding Circuit

Figure 15:
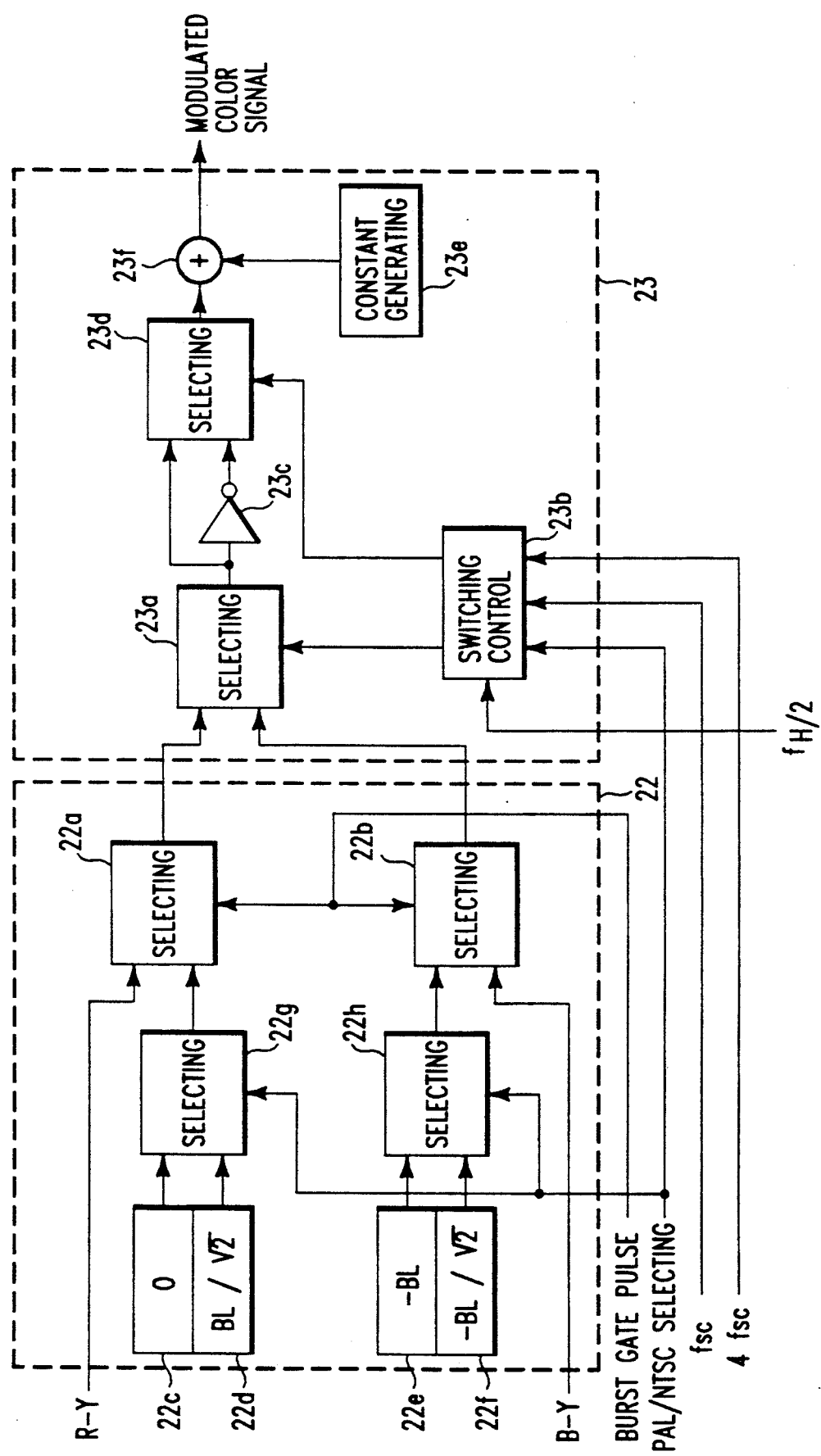
FIG. 15 is a block diagram showing structures of a burst adding circuit and an encoding circuit shown in FIG. 1B.

FIG. 15 is a block diagram showing a specific structure of burst adding circuit 22 and encoding circuit 23 shown in FIG. 1B. Burst adding circuit 22 generates data having levels corresponding to burst signals in accordance with PAL system and NTSC system.

In the NTSC system, burst data 0, $B_L$, 0, $-B_L$, ... should be generated by utilizing 0 and $-B_L$ in this order at a frequency of 4 $f_{sc}$. In the PAL system, data $B_L/\sqrt{2}$, $-B_L/\sqrt{2}$, $-B_L/\sqrt{2}$, $-B_L/\sqrt{2}$ in this order should be generated by utilizing $B_L/\sqrt{2}$ and $-B_L/\sqrt{2}$ at a frequency of 4 $f_{sc}$.

Therefore, data generating circuits 22*c* to 22*f* supply the above mentioned prescribed data 0, $B_L/\sqrt{2}$, $-B_L$, $-B_L/\sqrt{2}$ to selecting circuits 22*g* and 22*h*, and supply selected output to selecting circuits 22*a* and 22*b* of the next stage by combining 0 and $-B_L$ or $B_L/\sqrt{2}$ and $-B_L/\sqrt{2}$ in accordance with a PAL/NTSC selecting signal. Each of the selecting circuits 22*a* and 22*b* receives a burst gate pulse as a control input and supplies, only during a burst period, data selected by the corresponding selecting circuit in the preceding stage.

Encoding circuit 23 effects quadrature phase modulation of (R-Y) and (B-Y) signals. In the NTSC system, it selects data in the order of (R-Y), (B-Y), $-$(R-Y) and $-$(B-Y) at a frequency of 4 $f_{SC}$, while in the PAL system, it selects data in the order of (R-Y), (B-Y), $-$(R-Y) and $-$(B-Y) for odd numbered lines, and selects data in the order of $-$(R-Y), (B-Y), (R-Y) and $-$(B-Y) for even numbered lines, at the frequency of 4 $f_{SC}$.

Therefore, referring to FIG. 15, an encoding circuit switching control circuit 23*b* receives a PAL/NTSC selecting signal, a signal of $f_{SC}$, a signal of 4 $f_{SC}$ and a signal of $f_H/2$ and generates a selection control signal, which is supplied to selecting circuits 23*a* and 23*d*. Consequently, selecting circuit 23*a* of the preceding stage alternately selects the (R-Y) signal and the (B-Y) signal at the frequency of 4 $f_{SC}$. Selected signals are directly applied to one input of selecting circuit 23*d* of the succeeding stage. The selected signals are also applied to a code inverting circuit 23*c* in which signs of the signals are inverted, and then they are applied to the other input of selecting circuit 23*d*. By the selection of this circuit 23*d*, sign arrangement of data is controlled, and desired phase modulated data can be provided.

The provided modulated data includes positive and negative data, and therefore it is difficult to effect D/A conversion of data. Therefore, an adder circuit 23*f* adds a constant supplied from a constant generating circuit 23*e* to the modulated data as shown in FIG. 1B, and applies the added output to D/A converting circuit 27 (FIG. 1B).

Although (R-Y) and (B-Y) signals are modulated in the above embodiment, the same effect can be provided by a structure modulating I and Q signals.

As described above, according to the present invention, signal processing incidental to an electronic zooming function is made possible while reducing the number of 1H delay elements to three (D1 to D3 of FIG. 1A), so that signal processing system in a digital video camera can be implemented on one chip.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An integrated circuit for processing digital signals for a video camera capable of effecting an electronic zooming function in which an output from a solid state image sensing device spatially modulated by a color filter is A/D converted into a digital signal and temporarily stored in a field memory, during operation of the electronic zooming function the stored digital signal is read from the field memory, said integrated circuit comprising:
   first, second and third 1H delay elements for successively delaying the digital signal read from said field memory by 1 horizontal period;
   first, second, third and fourth luminance/color signal (Y/C) separating means for separating said digital signal and output signals from each of said first, second and third 1H delay elements, respectively, into luminance components and two types of line sequential color components;
   first RGB synthesizing means for forming a first set of three primary color signals based on said output signals from said first, second and third Y/C separating means;

second RGB synthesizing means for forming a second set of three primary color signals based on said output signals from said second, third and fourth Y/C separating means;

luminance signal interpolating means for synthesizing luminance signals corresponding to new display points which are to be formed in carrying out the electronic zooming function, based on output signals from said second and third Y/C separating means; and color signal interpolating means for synthesizing three primary color signals corresponding to the new display points which are to be formed in carrying out the electronic zooming function, based on said first and second sets of three primary color signals.

2. The integrated circuit for processing digital signals according to claim 1, further comprising zero level adjusting means for adjusting a reference level of said digital signal so that a level of an optical black portion of the digital signal read from said field memory has a zero level.

3. The integrated circuit for processing digital signals according to claim 1, further comprising means for generating a contour enhancement signal in a vertical direction based on luminance component outputs from said first, second, third and fourth Y/C separating means; and means for generating a contour enhancement signal in a horizontal direction based on an output from said luminance signal interpolating means.

4. The integrated circuit for processing digital signals according to claim 3, further comprising means for providing contour enhancement to a luminance signal output from said luminance signal interpolating circuit, based on said contour enhancement signals in the vertical and horizontal directions.

5. The integrated circuit for processing digital signals according to claim 4, wherein each of said first and second RGB synthesizing means further comprises:

means for simultaneously processing two types of line sequential color components produced by said Y/C separating means by calculating an arithmetic mean for each type of line sequential color component, and by using an arithmetic mean coefficient determined based on the luminance components produced by said Y/C separating means, and RGB synthesizing processing means for effecting a prescribed arithmetic operation on the luminance components produced by the Y/C separating means and on an output from said simultaneous processing means, for providing in parallel a set of three primary color signals.

6. The integrated circuit for processing digital signals according to claim 5, wherein said luminance signal interpolating means further comprises:

vertical interpolating means for effecting interpolation in a vertical direction on outputs from said second and third Y/C separating means, and horizontal interpolating means for effecting interpolating in horizontal direction on an output from said vertical interpolating means; and said color signal interpolating means further comprises:

a set of vertical interpolating means for effecting interpolation in a vertical direction on every color signal based on said first and second sets of primary color signals; and a set of horizontal interpolating means for effecting interpolation in a horizontal direction on outputs from said set of vertical interpolating means.

7. The integrated circuit for processing digital signals according to claim 6, wherein each of said vertical and horizontal interpolating means further comprises:

means for calculating a luminance signal or a color signal corresponding to a new display point provided by equally dividing a space between adjacent points of a picked up image, by proportionally distributing said digital luminance or color signal corresponding to a point of picked up image to said new display point.

8. The integrated circuit for processing digital signals according to claim 6, further comprising edge chroma suppressing means responsive to said vertical and horizontal contour enhancement signals for suppressing levels of three primary color signals supplied from said set of horizontal interpolating means.

9. The integrated circuit for processing digital signals according to claim 8, wherein said edge chroma suppressing means further comprises:

means for detecting an uncorrelated portion of said luminance signal based on said vertical and horizontal contour enhancement signals, and a set of edge chroma suppressing circuits responsive to an output from said detecting means for suppressing, color by color, levels of said three primary color signals.

10. The integrated circuit for processing digital signals according to claim 8, further comprising means for effecting gamma correction on the luminance signal produced by said contour enhancing means and on the three primary color signals produced by said edge chroma suppressing means.

11. The integrated circuit for processing digital signals according to claim 10, further comprising matrix means for converting the three primary color signals which have been subjected to said gamma correction into two types of color difference signals.

12. The integrated circuit for processing digital signals according to claim 11, further comprising low saturation chroma suppressing means for suppressing signal levels at a low saturation region of the color difference signals supplied from said matrix means.

13. The integrate circuit for processing digital signals according to claim 12, further comprising means for adding data having a level corresponding to a burst signal to the two types of color difference signals produced by said low saturation chroma suppressing means, and encoding means for effecting quadrature phase modulation of the two types of color difference signals to which said burst level data has been applied.

14. The integrated circuit for processing digital signals according to claim 13, further comprising means for D/A converting and externally outputting an output from said encoding means, and means for D/A converting and externally outputting the luminance signal which has been subjected to said gamma correction.

15. The integrated circuit for processing digital signals according to claim 1, wherein
each of said first, second and third 1H delay elements is formed of a random access memory.

16. An integrated circuit for processing digital signals for a video camera capable of effecting an electronic zooming function in which an output from a solid state image sensing device spatially modulated by a color filter is A/D converted into a digital signal and temporarily stored in a field memory, during operation of the electronic zooming function, the stored digital signal is read from the field memory, said integrated circuit comprising:

first, second and third 1H delay elements for successively delaying the digital signal read from said field memory by 1 horizontal period;

first, second, third and fourth luminance/color signal (Y/C) separating means for separating said digital signal and output signals from each of said first, second and third 1H delay elements, respectively, into luminance components and two types of line sequential color components;

first RGB synthesizing means for forming a first set of three primary color signals based on said output signals from said first, second and third Y/C separating means;

second RGB synthesizing means for forming a second set of three primary color signals based on said output signals from said second, third and fourth Y/C separating means;

luminance signal interpolating means for synthesizing luminance signals corresponding to new display points which are to be formed in carrying out the electronic zooming function, based on output signals from said second and third Y/C separating means; and color signal interpolating means for synthesizing three primary color signals corresponding to the new display points which are to be formed in carrying out the electronic zooming function, based on said first and second sets of three primary color signals; and means for converting the three primary color signals supplied from said color signal interpolating means into one string of color signals by time divisionally multiplexing and band compressing each of said color signals.

* * * * *